(12) United States Patent
Pechter et al.

(10) Patent No.: US 11,476,628 B2
(45) Date of Patent: Oct. 18, 2022

(54) SYSTEM FOR AUTOMATIC ROBOTIC CABLE CONNECTOR ASSEMBLY USING A CARTRIDGE

(71) Applicant: Frisimos, Ltd., Ra'anana (IL)

(72) Inventors: Tal Pechter, Ramat Hasharon (IL); Hanan Ben-Ron, Givataim (IL)

(73) Assignee: Frisimos, Ltd., Ra'anana (IL)

( * ) Notice: Subject to any disclaimer, the term of this patent is extended or adjusted under 35 U.S.C. 154(b) by 0 days.

(21) Appl. No.: 17/075,160

(22) Filed: Oct. 20, 2020

(65) Prior Publication Data

US 2021/0143604 A1 May 13, 2021

Related U.S. Application Data

(60) Provisional application No. 62/934,484, filed on Nov. 12, 2019.

(51) Int. Cl.
*B23P 19/00* (2006.01)
*H01R 43/28* (2006.01)
(Continued)

(52) U.S. Cl.
CPC .............. *H01R 43/28* (2013.01); *B25J 11/00* (2013.01); *H02G 1/1248* (2013.01); *Y10T 29/5313* (2015.01)

(58) Field of Classification Search
CPC ......... B23P 11/005; B23P 19/04; B23P 19/10; A61B 2018/00178; H01R 43/28; H01R 43/05; Y10T 29/5313
(Continued)

(56) References Cited

U.S. PATENT DOCUMENTS

| 3,149,390 A | 9/1964 | Mccoy |
| 3,153,358 A | 10/1964 | Havens |

(Continued)

FOREIGN PATENT DOCUMENTS

| CA | 1329981 C | 6/1994 |
| CA | 2454093 C | 3/2010 |

(Continued)

OTHER PUBLICATIONS

Frisimos: "Fully Automated Cable Assembly Line—Google Search", XP055555786, Jul. 28, 2017, at the following URL address: http://frisimos.com/wp-content/uploads/videos/FRISIMOS%20FINAL.mp4 The Search report and Provisional Opinion dated Feb. 20, 2019 states that the date of the video is Jul. 28, 2017.

(Continued)

*Primary Examiner* — Thiem D Phan
(74) *Attorney, Agent, or Firm* — Lempia Summerfield Katz LLC

(57) ABSTRACT

An automatic-robotic-system-for-cable assembly system and method is provided. The method and system are configured to use a cartridge which holds one or both ends of the cable. The cartridge moves along an automatic cable assembly line, with the line segmented into different stages, at which a process is performed by a specific machine. Different machines, such as actuators or modular machines, perform operations on the cartridge at the different stages. In preparation for or as part of the operations, the actuators or modular machines may directly physically apply one or more forces to a cable held by the cartridge, causing the cable to spool toward or away from the modular machines.

20 Claims, 28 Drawing Sheets

(51) Int. Cl.
*B25J 11/00* (2006.01)
*H02G 1/12* (2006.01)

(58) Field of Classification Search
USPC ......... 29/729, 747, 748, 795, 592, 825, 842, 29/854, 857, 874
See application file for complete search history.

(56) References Cited

U.S. PATENT DOCUMENTS

| | | |
|---|---|---|
| 3,768,143 A | 10/1973 | Holmes, Jr. |
| 3,953,706 A | 4/1976 | Harris et al. |
| 4,653,159 A | 3/1987 | Henderson |
| 4,683,636 A | 8/1987 | Henderson |
| 4,704,925 A | 11/1987 | Sutton |
| 4,733,463 A | 3/1988 | Kolanowski |
| 4,916,811 A | 4/1990 | Uehara |
| 4,977,934 A | 12/1990 | Anderson |
| 5,994,646 A | 11/1999 | Broeksteeg et al. |
| 6,003,341 A | 12/1999 | Bloom |
| 6,341,242 B1 | 1/2002 | Mahmood |
| 6,631,554 B1 | 10/2003 | Sato et al. |
| 6,895,654 B2 | 5/2005 | Strandberg |
| 6,964,288 B2 | 11/2005 | Christopher |
| 8,052,836 B2 | 11/2011 | Cale et al. |
| 8,302,295 B2 | 11/2012 | Tanaka |
| 8,406,598 B2 | 3/2013 | Christopher et al. |
| 8,772,671 B2 | 7/2014 | Broude et al. |
| 9,673,587 B2 | 6/2017 | Pechter et al. |
| 9,837,778 B2 | 12/2017 | Pechter et al. |
| 10,404,028 B2 * | 9/2019 | Pechter .............. H01R 43/0249 |
| 2005/0006345 A1 | 1/2005 | Thomas et al. |
| 2006/0065640 A1 | 3/2006 | Lizotte et al. |
| 2006/0084957 A1 | 4/2006 | Delfyett et al. |
| 2010/0282487 A1 | 11/2010 | Tanaka |
| 2011/0127697 A1 | 6/2011 | Milne |
| 2014/0174267 A1 | 6/2014 | Stepan et al. |
| 2016/0285221 A1 | 9/2016 | Pechter et al. |

FOREIGN PATENT DOCUMENTS

| | | |
|---|---|---|
| EP | 0117273 A1 | 9/1984 |
| JP | 02197206 A | 8/1990 |
| JP | 7065652 A | 3/1995 |
| WO | 2015125129 A1 | 8/2015 |
| WO | 2017037691 A1 | 3/2017 |

OTHER PUBLICATIONS

PCT International Preliminary Report on Patentability and Written Opinion of International Searching Authority, corresponding to PCT International Application No. PCT/US2018/058861 dated May 5, 2020.

Search report and Provisional Opinion accompanying the partial search result in PCT Application No. PCT/US2018/058861, dated Feb. 20, 2019. 17 pages.

Video entitled "Automated cable cutting machine (Genoa Mkll—2mm)" listed as published on Jun. 6, 2011, is at URL https://youtube.com/watch?v=xfaHkcp6qws?

* cited by examiner

SYSTEM FOR AUTOMATIC ROBOTIC CABLE CONNECTOR ASSEMBLY USING A CARTRIDGE

REFERENCE TO RELATED APPLICATIONS

This application claims the benefit of US Provisional Application No. 62/934,484 filed on Nov. 12, 2019, the entirety of which is incorporated by reference herein.

TECHNICAL FIELD

The present disclosure generally relates to cable and connector industry, and more particularly the disclosure relates to a system and method of assembly connectors and cables.

BACKGROUND

Electronic devices may communicate with one another. Connectivity amongst the different electronic devices may be facilitated by using physical connectors (such as cables). The connectors may have various parameters such as: size, labeling, interface parameters, structure, etc. Interface parameters may include: number of connectivity pads (e.g., pins), the layout of the connectivity pads and their physical size, etc.

Further, there are many different types of connectors. Examples of different standard connector types include, but are not limited to: an eight position-eight conductor (8P8C) modular connector with eight positions, which may be used in Ethernet® communications; a D-subminiature electrical connector commonly used for the RS-232 serial port on: modems, computers, telecommunications, test and measurement instruments; an HDMI (High-Definition Multimedia Interface) connector compact audio/video interface for transferring uncompressed video data and compressed/uncompressed digital audio data from a HDMI-compliant device ("the source device") to a compatible computer monitor, video projector, digital television, or digital audio device; a Universal Serial Bus (USB) connector (e.g., USB 2.0 has a 4-pin connector; USB 3.0 has 9 pins surrounded by a shield); a Power connector which may include a safety ground connection as well as the power conductors for different household equipment; a RF Connector used at radio frequencies having constant impedance of its transmission line; a R-TNC (Reverse threaded Neill-Concelman) connector used for Wi-Fi antennas; a BNC connector for used in radio and test equipment; DC connector which may supply direct current (DC) power; Hybrid connectors which may have housings with inserts that allow intermixing of many connector types, such as those mentioned above; optical fiber connectors; and many more different types of connectors.

Each field/system/device may have a standard or custom electrical cable that has different parameters. Example of electrical cable's parameters may include any one, any combination or all of: length; cable diameter; number of inner-wires; inner-wire coloring; inner-wire diameter; cable color; labeling; insulation/shielding; and winding/twisting.

A cable may comprise two or more wires running side by side and bonded, twisted, or braided together to form a single assembly. Any current-carrying conductor, including a cable, radiates an electromagnetic field. Likewise, any conductor or cable will pick up energy from any existing electromagnetic field around it, and in the first case, may result in unwanted transmission of energy that may adversely affect nearby equipment or other parts of the same piece of equipment; and in the second case, unwanted pickup of noise that may mask the desired signal being carried by the cable.

There are particular cable designs that minimize electromagnetic pickup and transmission. Three of the principal design techniques are shielding, coaxial geometry, and twisted-pair geometry, for example. Shielding makes use of the electrical principle of the Faraday cage. The cable is encased for its entire length in foil or wire mesh. In some cables a grounded shield on cables operating at 2.5 kV or more gathers leakage current and capacitive current.

Coaxial design may help to further reduce low-frequency magnetic transmission and pickup. In this design, an inner conductor is surrounded by a tubular insulating layer, surrounded by a tubular conducting shield. Many coaxial cables also have an insulating outer sheath or jacket. The foil or mesh shield has a circular cross section and the inner conductor is exactly at its center. This causes the voltages induced by a magnetic field between the shield and the core conductor to consist of two nearly equal magnitudes which cancel each other.

Twisted pair cabling is a type of wiring in which two conductors of a single circuit are twisted together for the purposes of canceling out electromagnetic interference (EMI) from external sources. A twist rate (also called pitch of the twist, usually defined in twists per meter) makes up part of the specification for a given type of cable. Where nearby pairs have equal twist rates, the same conductors of the different pairs may repeatedly lie next to each other, partially undoing the benefits of differential mode. For this reason, it is commonly specified that, at least for cables containing small numbers of pairs, the twist rates must differ.

Twisted pair cables may be shielded in an attempt to prevent electromagnetic interference. Because the shielding is made of metal, it may also serve as a ground. Typically, a shielded or a screened twisted pair cable has a special grounding wire added called a drain wire which is electrically connected to the shield or screen.

This shielding may be applied to individual pairs, or to the collection of pairs. When shielding is applied to the collection of pairs, this is referred to as screening. Shielding provides an electric conductive barrier to attenuate electromagnetic waves external to the shield and provides conduction path by which induced currents can be circulated and returned to the source, via ground reference connection.

A few examples of different field electrical cables can include: Category 1 cable (Cat 1) or voice-grade copper, which is a grade of unshielded twisted pair cabling designed for telephone communications; Cat6 (Category 6 cable), which is a standardized cable for Gigabit Ethernet and other network physical layers; an HDMI cable of about 5 meters (16 ft.), which can be manufactured to Category 1 specifications by using 28 AWG (0.081 mm$^2$) conductors or by 24 AWG (0.205 mm$^2$) conductors, an HDMI cable can reach lengths of up to 15 meters (49 ft.).

Individual USB cables may run as long as 5 meters for 12 Mbps connections and 3 meters for 1.5 Mbps. With hubs, devices can be up to 30 meters away from the host, the USB 2.0 type cable has two wires that supply the power to the peripherals (−/+)5 volts (red color) and ground (brown) and a twisted pair (yellow and blue) of wires to carry the data. On the power wires, a computer can supply up to 500 milliamps of power at 5 volts; etc.

Although some cables and connectors have standard specification (parameters), others may have a custom tailored-made specification. Original equipment manufacturers (OEM) as well as automotive and defense industries often require custom cables and/or connectors for their equipment, for example. Tailoring may include any one, any combination, or all of the following different variables: lengths, insulation coloring, labels, sizes, diameter, etc. Further, the cable harnesses may be tailored. For example, a cable harness may have two or more connectors, connected by any topology and connection scheme according to a customer demand.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1:
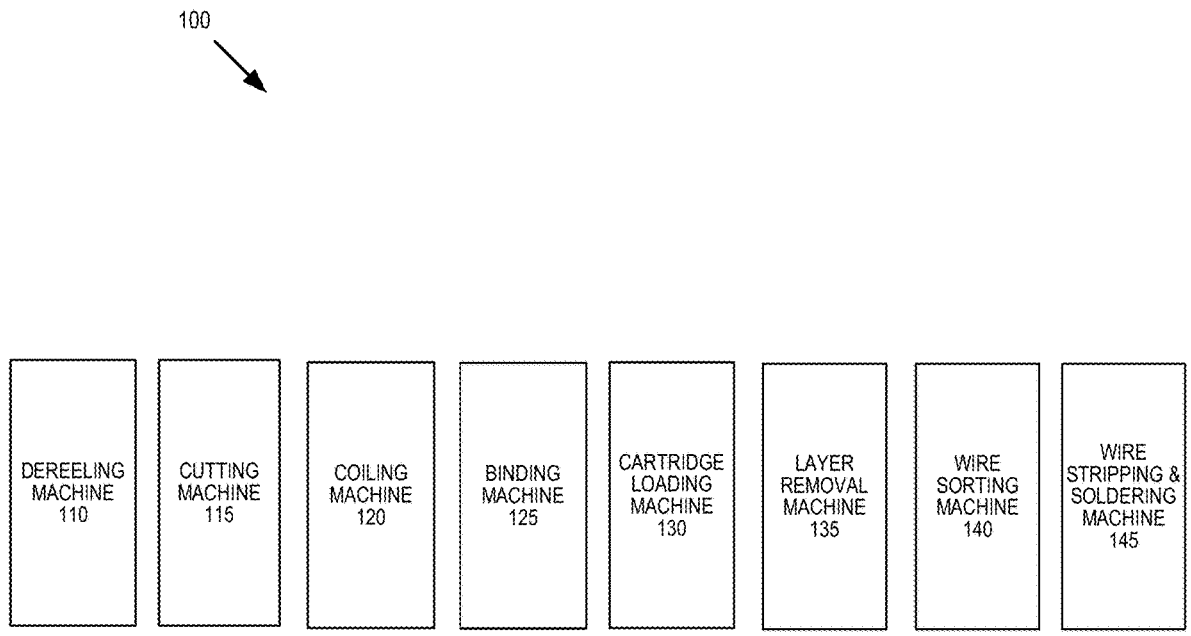
FIG. 1 illustrates a series of line machines which may process a cable.

The current process of assembling electrical cables is dependent on human work. Specifically, the current process is based on a series of serial activities, transforming the raw material (such as raw cable or connectors), into the final assembled cable. Typically, each activity is considered a stage in the process, and is performed using some kind of tool, such as scissors, a screw, or more advanced tool such as a cable cutting machine, a cable jacket striping machine and others. In this regard, the current process is heavily dependent on human intervention. An example of an automatic cable assembly is disclosed in U.S. Pat. No. 10,404, 028, incorporated by reference herein in its entirety.

The automatic cable assembly system may include any one, any combination, or all of: the cartridge; the machines (e.g., the modular machines discussed below); the conveyor system for moving the cartridge from stage to stage (e.g., system for moving the cartridge from stage to stage, such as for a pallet based system or an indexed line system); control electronics (e.g., a central controller in combination with bar code readers/RFID readers); and cartridge manipulation when at a stage (e.g., one or more actuators (such as one or more feeders) for manipulating the cartridge at a stage in the automatic assembly line).

The various aspects of the automatic cable assembly process and system are configured to perform the various stages of the automatic assembly line. Functions at stages in the automatic assembly line include any one, any combination, or all of the following:

1. cut the cable to measure.
2. roll the cable onto the cartridge and leave one or both ends free for subsequent processing (or pre-coiling the cable and then placing the pre-coiled cable onto the cartridge).
3. place ferrite bead (or other substance) on the cable end.

4. strip the cable outer isolation (e.g., strip the jacket of the cable).

5. strip the cable outer braded shield (if the cable outer braded shield is present for the specific type of cable).

6. strip the cable outer aluminum foil shield (if the cable outer aluminum foil shield is present for the specific type of cable).

7. sort the inner cable items (various types of wires may be included in the cable, including, but not limited to: separate wires; twisted wires; shielded wires or shielded pairs; drain wires; etc.). As discussed in more detail below, the system may perform the sorting using a comb. In one implementation, one specific modular machine performs the untwisting of twisted pairs, and another specific modular machine performs the removal of the shield from twisted pair. In an alternate implementation, a single modular machine performs the untwisting of twisted pairs, and performs the removal of the shield from twisted pair.

8. remove inner MYLAR material which covers part of the wires or shielded pairs (if the MYLAR material is present in the cable).

9. strip the isolation of the wires.

10. after sorting, strip the shield (for a cable of shielded wires and shielded pairs).

11. strip the isolation from the wires, so now the wires' copper ends are exposed.

12. coat the wires' copper ends with tin (or other type of material).

13. solder the coated wires ends to the connector pads (the connectors may be fed to the soldering machine separately).

14. mechanically assemble the connectors cases on the connectors.

15. perform electrical testing on the cable (if desired). In one implementation, the modular machine that performs the electrical testing may be connected to both sides of the cable in order to perform the electrical test while electrically contacting both sides of the cable.

As discussed in more detail below, the cable under construction may include the same connectors at each end, or may include two different ends. For example, in a USB cable, one side of the cable can be a first type of USB connector (e.g., USB-A connector) and the other side can be a second type of USB connector (e.g., micro-USB connector).

Further, the cartridge may hold the cable during the assembly process and enable the one or more modular machines to conduct the desired operations on one or both cable ends. As discussed below, the cartridge may include any one, any combination or all of the following functions and features:

1. the cartridge is configured to move from station to station on an automated line. Different types of automated lines are contemplated. As one example, the cartridge may be mounted or attached to a pallet, in the case where the automated line is a pallet line. As another example, the cartridge may be mounted or attached to a rotating chain, in the case where the automated line is an indexed line.

2. accept the cable from the modular machine that cuts the cable to measure.

3. roll the cable (e.g., as discussed further below, the cartridge includes a structure configured to hold the rolled cable so that a machine may wrap the cable onto the structure, thereby rolling the cable); alternatively, pre-coil the cable and then place the pre-coiled cable onto the cartridge.

4. after the rolling, place the cable so that both ends of the cable face horizontally to the cartridge front.

5. move the cable ends to front and back (e.g., move the cable ends longitudinally).

6. hold the two combs, one for each cable end.

7. move the cable and comb to front and back.

8. horizontally rotate the cable ends (e.g., +/−45°, +/−90°, +/−180°) on the longitudinal axis degrees if needed (e.g., longitudinally rotate one or both of the cable ends).

9. vertically rotate the cable ends, so that the cable ends will face down, for dipping the wire copper ends into a bath (e.g., a tin bath).

FIG. 1 illustrates a series of line machines 100 which may process a cable. FIG. 1 illustrates one example of a series of machines. Other combinations are contemplated. Dereeling machine 110 is configured to dereel the unprocessed cable from a spool. Cutting machine 115 is configured to cut the unprocessed cable that has been dereeled. Coiling machine 120 is configured to coil the cut unprocessed cable. Binding machine 125 is configured to bind at least a part of the coiled unprocessed cable. As one example, the binding machine 125 may affix a tie to a section of the coiled unprocessed cable, such as the circular section (see 226) of the coiled unprocessed cable.

Cartridge-loading machine 130 is configured to load the bound coiled unprocessed cable onto the cartridge. The loading of the bound coiled unprocessed cable onto the cartridge may be performed in one of several ways. In one way, cartridge-loading machine 130 includes a plurality of grippers configured to grip the bound coiled unprocessed cable in multiple places. In this way, the grippers may hold the bound coiled unprocessed cable in transit to the cartridge. As one example, the plurality of grippers may grip each loose end of the bound coiled unprocessed cable and the circular section of the bound coiled unprocessed cable. Alternatively, the plurality of grippers may grip each loose end of the bound coiled unprocessed cable but not the circular section of the bound coiled unprocessed cable. As described in more detail below, the cartridge may include multiple grippers, such as pincers 215, 216 and pincers 217, 218, which may be proximate to an end of the respective sliding member.

Figure 2A:
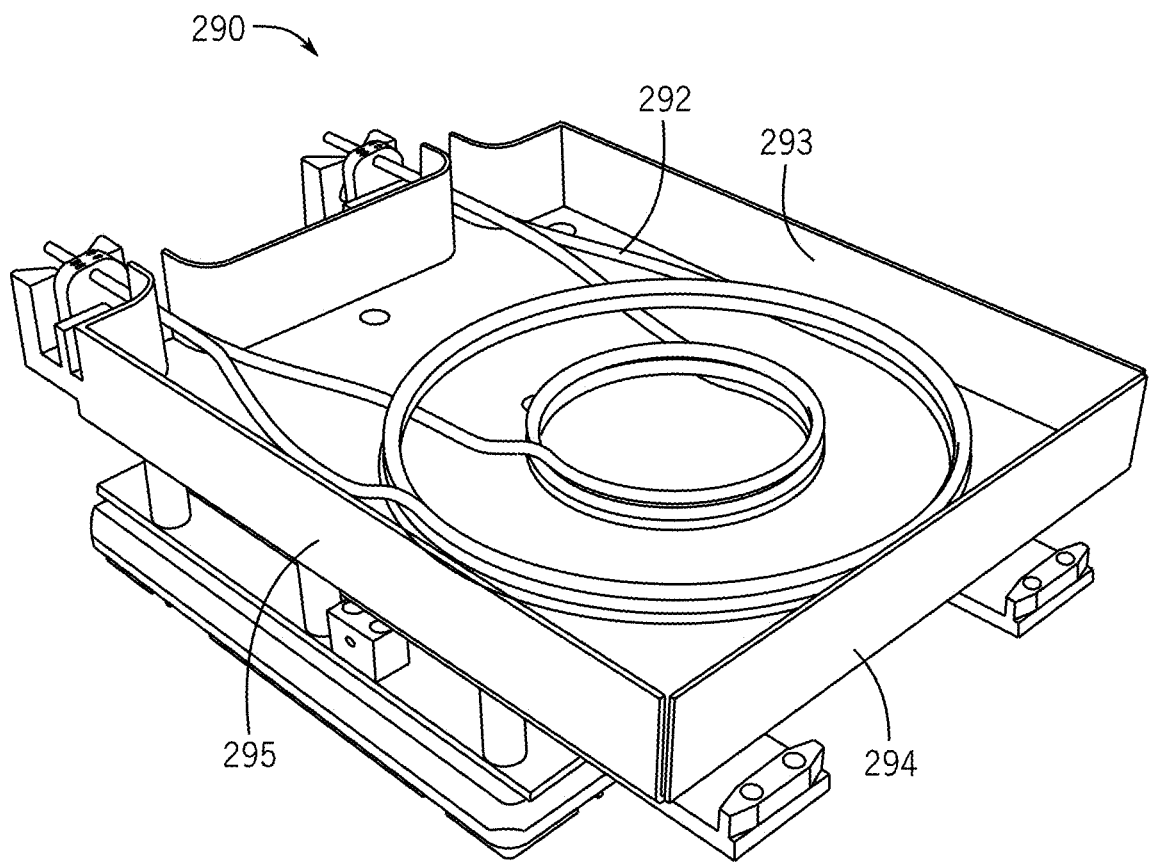
FIG. 2A is an example of a cartridge shown in perspective view.
Figure 2B:
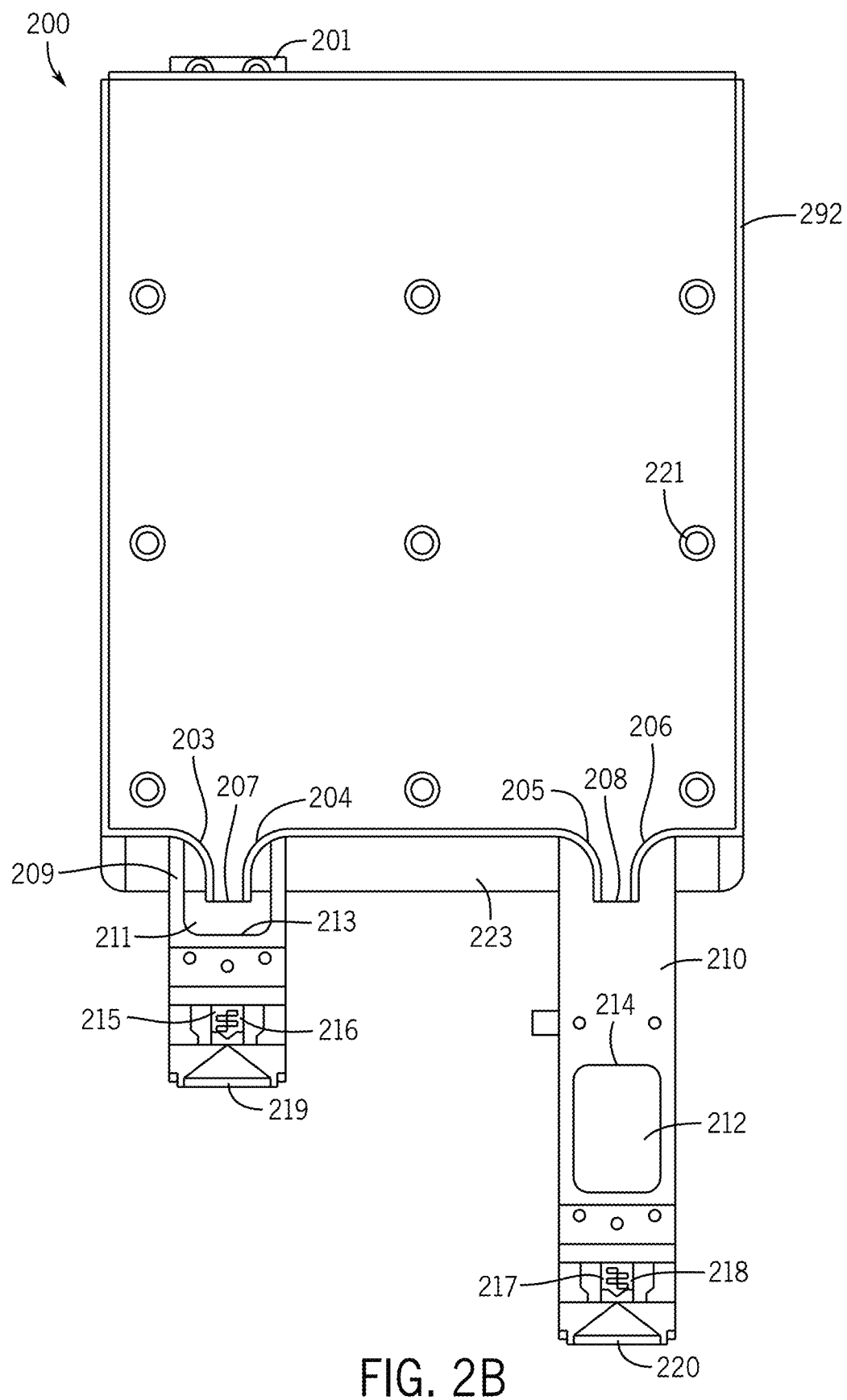
FIG. 2B is the example of the cartridge, shown in top view with one arm retracted and another arm extended.
Figure 2C:
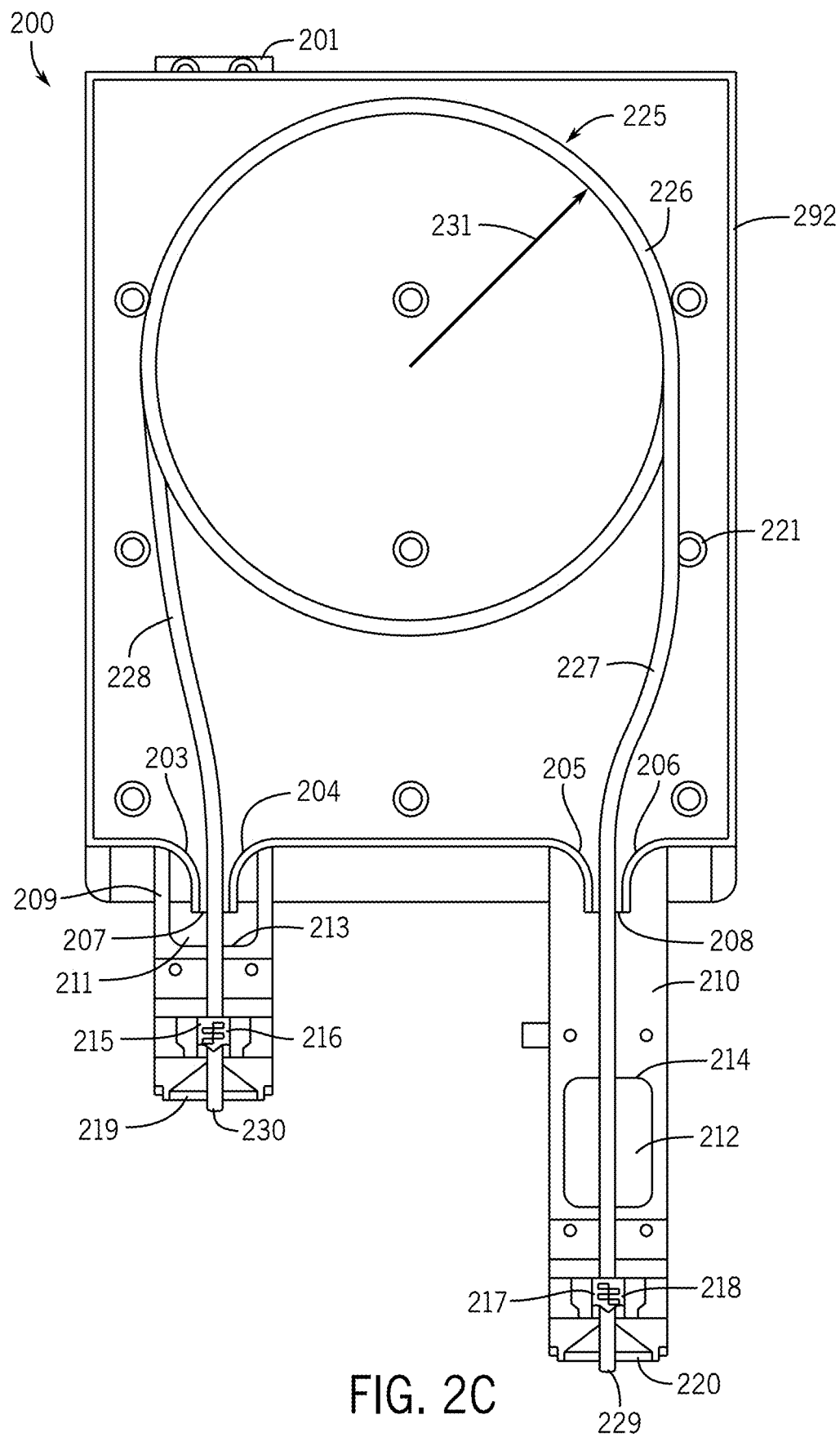
FIG. 2C is identical to FIG. 2B with a pre-coiled cable placed on the cartridge.
Figure 2D:
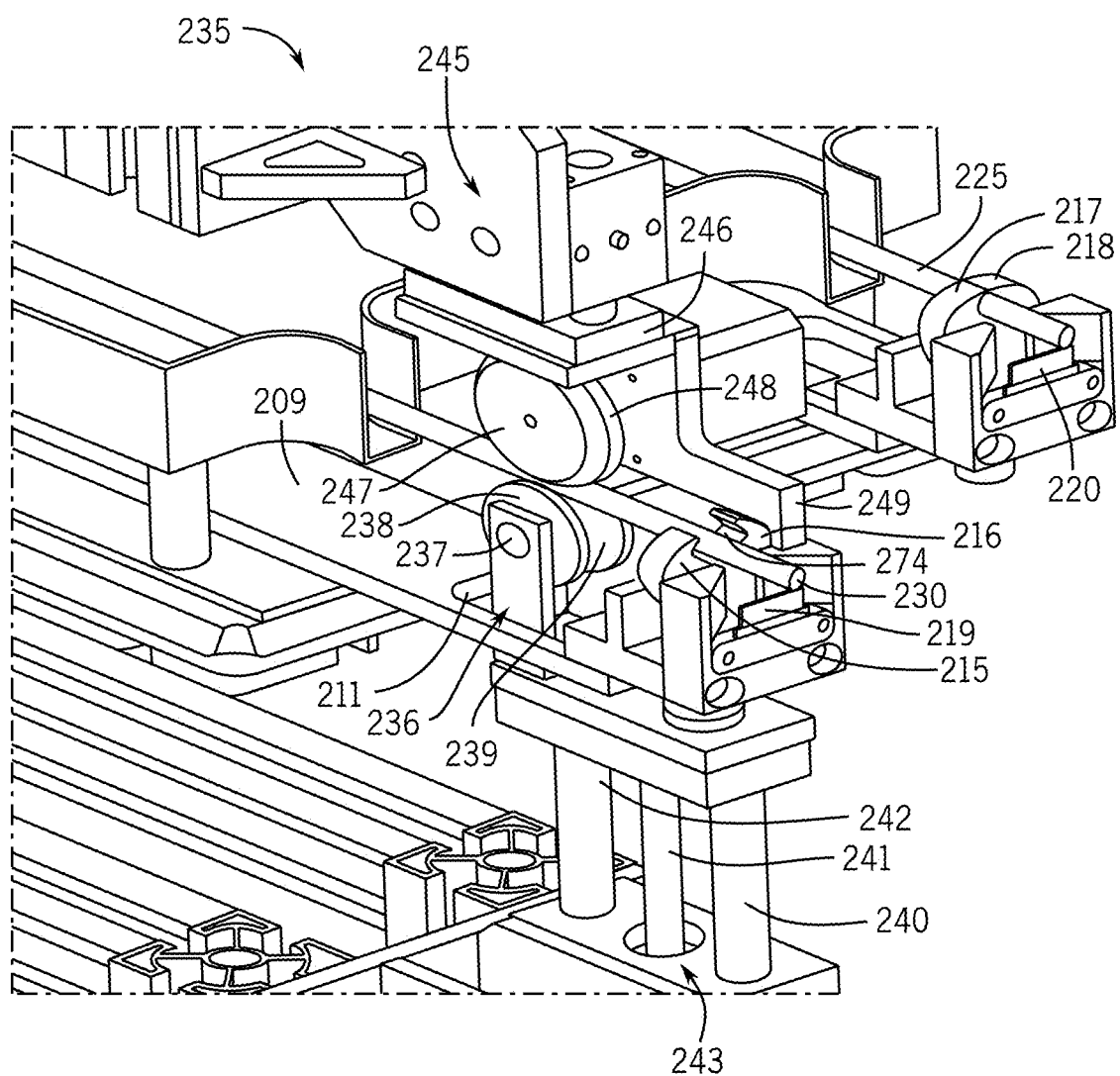
FIG. 2D illustrates a front perspective view of the example of the cartridge, with one cable end being extended or retracted, relative to the respective arm, using one or more external rollers.
Figure 2E:
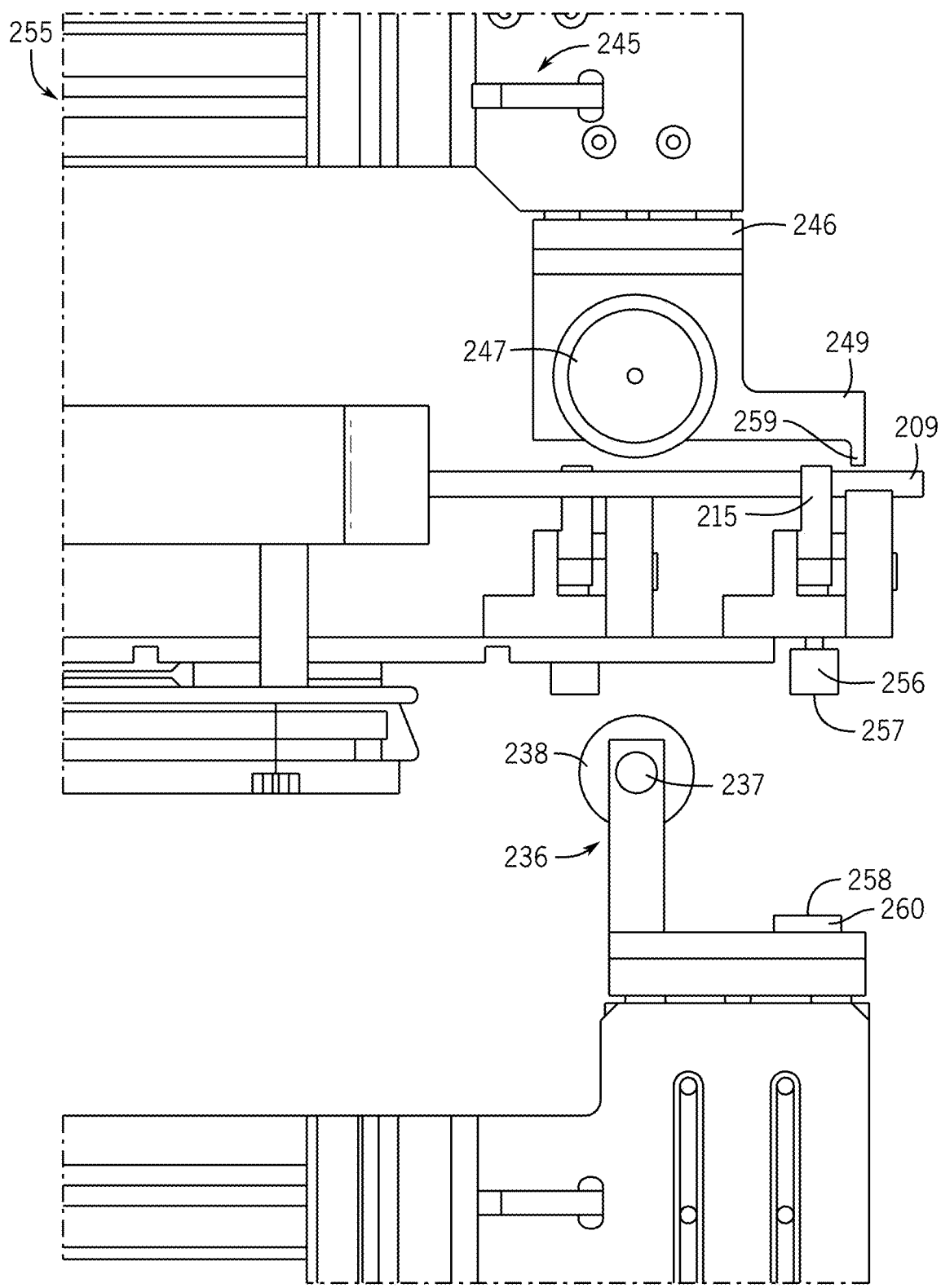
FIG. 2E illustrates a side view of the example of the cartridge, prior to the external rollers contacting the one cable end in order to extend or retract, relative to the respective arm, the cable at the one cable end.
Figure 2F:
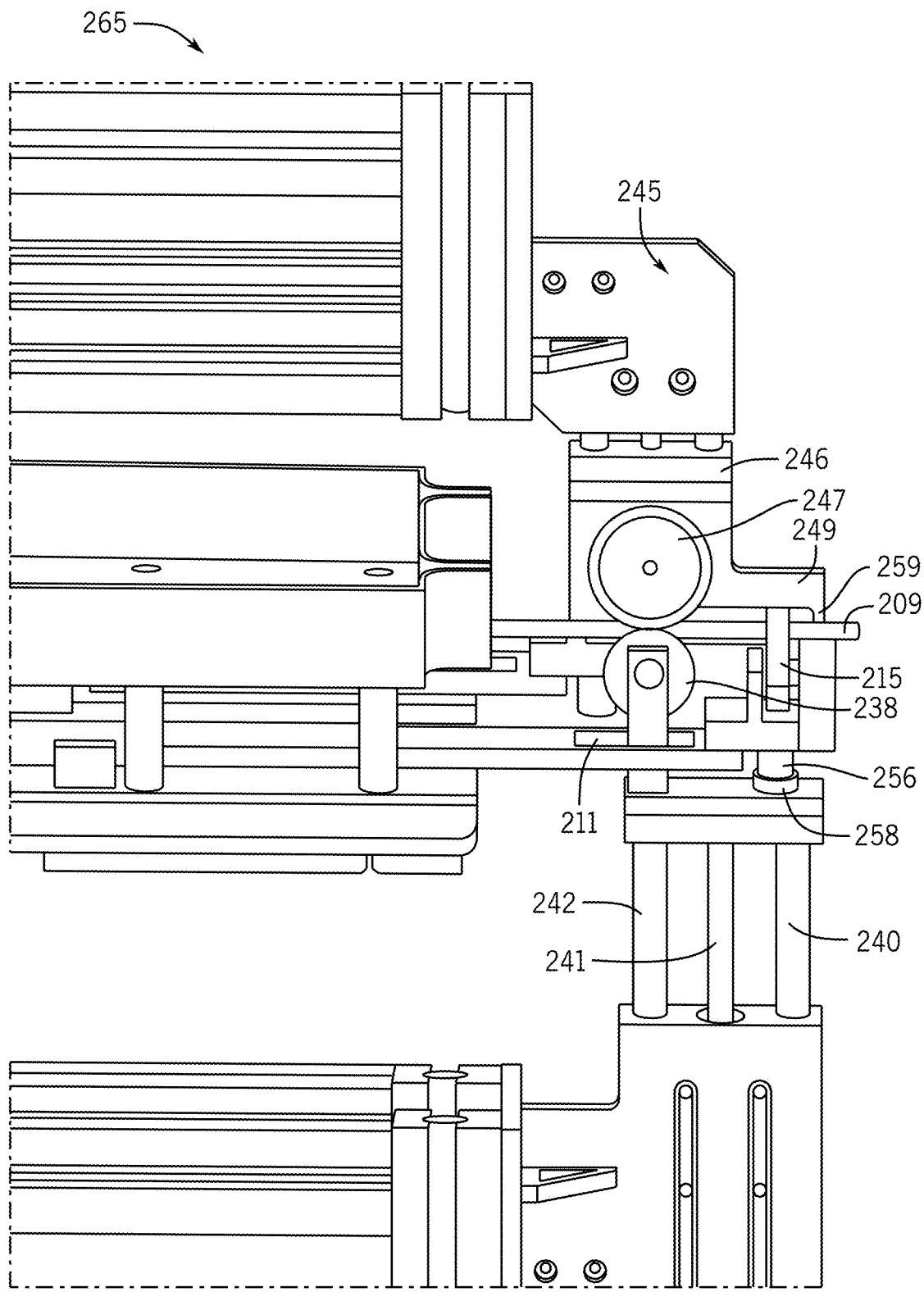
FIG. 2F illustrates the side view of the example of the cartridge, with the external rollers contacting the one cable end in order to extend or retract, relative to the respective arm, the cable at the one cable end.

Cartridge-loading machine 130 may be configured to release the multiple grippers on the cartridge, such as releasing by pincers 215, 216 and pincers 217, 218 using a structure similar to that disclosed in FIGS. 2D-F (e.g., movable structure 243 configured to activate piston 256 and hook 249). In one implementation, cartridge-loading machine 130 may release pincers 215, 216 and pincers 217, 218 at least partly simultaneously. In that regard, cartridge-loading machine 130 may include duplicate movable structures 243 and hooks 249, with one configured to release pincers 215, 216 and second to release pincers 217, 218. In practice, prior to placing the respective loose ends of the bound coiled unprocessed cable onto the cartridge, cartridge-loading machine 130 releases pincers 215, 216 and pincers 217, 218. After releasing pincers 215, 216 and pincers 217, 218, cartridge-loading machine 130 places the bound coiled unprocessed cable onto the cartridge (e.g., places the circular section 226 onto flat portion 292 and places loose ends 229, 230 onto platforms 209, 210). After placing the bound coiled unprocessed cable onto the cartridge, the cartridge-loading machine 130 may remove the force applied to pincers 215, 216 and pincers 217, 218 (so that pincers 215, 216 and pincers 217, 218 close onto the respective loose ends of the bound coiled unprocessed cable). After which, cartridge-loading machine 130 may release the plurality of grippers that were holding the bound coiled unprocessed cable in transit to the cartridge. Alternatively, cartridge-loading machine 130 may release the plurality of grippers before releasing pincers 215, 216 and pincers 217, 218. Alternatively, or in addition, cameras and/or sensors may be used for cartridge-loading machine 130 to determine whether the bound coiled unprocessed cable is properly aligned with the cartridge for placement.

In this regard, the end of one or both of the cables may be spooled outwardly or inwardly one or more rollers external to the pallet, with a machine configured to move the one or more rollers to be in direct physical contact with the cable in order to impart force in order to spool the cable in/out. The cable may be held in at least one gripper (e.g., the gripper may be spring loaded with two sections so that when closed, the gripper is configured to hold the cable in place on the pallet and when opened the gripper does not hold the cable so that the cable is able to move). The gripper may be released prior to imparting motive force from the directly contacting roller to the cable. Further, an external device may apply a force on at least one side of the platform at least partly when the roller is in physical contact and applying motive force to move the cable (e.g., applies force on one side, such as the top side, the right side, the left side, etc. (on which the cable rests) and on an opposing side of the platform. After making physical contact, one or more mechanisms, such as a piston and/or a hook, may release the gripper that holds the cable.

In an alternative implementation, cartridge-loading machine 130 may place each loose end of the bound coiled unprocessed cable one at a time into the cartridge. For example, cartridge-loading machine 130 may first open pincers 215, 216, place the first loose end of the bound coiled unprocessed cable onto a platform, release the grippers of cartridge-loading machine 130 holding the first loose end, and then close pincers 215, 216. After which, cartridge-loading machine 130 may open pincers 217, 218, place the second loose end of the bound coiled unprocessed cable onto platform 209, release the grippers of cartridge-loading machine 130 holding the second loose end, and then close pincers 217, 218.

Referring back to FIG. 1, after cartridge-loading machine 130, layer removal machine 135 is configured to remove one or more layers, such as one or both of the insulator layer or the metal foil shield. Wire sorting machine 140 is configured to sort one or more of the wires in the cable. Wire stripping & soldering machine 145 is configured to strip one or more wires and solder the one or more wires onto a connector. FIG. 1 illustrates merely one example of a sequence of machines. Other sequences are contemplated including machines configured to apply metal (such as tin) onto the wires, crimping machines, or the like.

In one implementation, a cartridge is used in order to move the cable through different stages (e.g., different stations) in the automatic cable assembly system. Specifically, the cartridge may include mechanical structures (e.g., passive force devices, such as springs and other elastic means) to hold the cable and/or the cable ends.

Further, the cartridge may be manipulated by an outside force in order to move the cable end. For example, the motive force and control may be resident outside of the cartridge (e.g., in any one, some, or all of: the conveyor, the actuators or the modular machines). Thus, in one implementation, the cartridge does not contain any devices that generate a force (e.g., motors, pistons, rotating devices, etc.) or electronics (e.g., control electronics). Instead, other devices, such as actuators, a central controller, and/or modular machines may perform one or both of the following functions: (1) determination as to what motive force to generate that is to be applied to the cartridge; and/or (2) control of the device that generates the force to be applied to the cartridge. Alternatively, the cartridge does not contain any devices that generate a force (e.g., motors, pistons, rotating devices, etc.) but includes control electronics. In still an alternate embodiment, the cartridge does not contain any devices that generate a force (e.g., motors, pistons, rotating devices, etc.) but does not include control electronics (instead including electronics configured to receive commands from an external device in order to control motor and/or actuators resident on the cartridge; in this regard, the cartridge is a follower device configured to receive and implement commands).

As discussed in further detail below, various devices, such as any one, any combination, or all of the central controller, actuators, or modular machines may perform functions (1) and/or (2). For example, the central controller may determine the protocols in order to process the cable and command various devices within the system, such as the modular machine(s) and/or actuators, in order to perform the protocols. As another example, the actuator and/or modular machine may determine to perform certain operations (e.g., be pre-programmed or dynamically determine to perform the certain operations), as discussed further below. As still another example, the central controller (an example of which is the line control machine) may send plans to the modular machines (e.g., the line machines). In turn, in one implementation, the modular machines may directly control their respective feeder machine (e.g., in the event that the feeder machine does not include a controller). In an alternate implementation, the modular machines may indirectly control their respective feeder machine (e.g., in the event that the feeder machine includes a controller, the modular machine may send a command to the feeder machine for the controller on the feeder machine to implement). The feeder machine is one example of an actuator, discussed above.

As discussed in further detail below, the cable may be moved by pushing the cable end frontward (e.g., toward a modular machine) or backward (e.g., away from the modular machine). In particular, the cable when housed in the cartridge may be moved toward the modular machine (which is stationary) and/or may be moved away the modular machine (which is stationary).

As discussed above, the line may include a plurality of modular machines. Each of the modular machines includes a specific function as part of the manufacturing process. In order to manufacture a specific product, the modular machines may perform a series of functions, as discussed above. In one implementation, software may assist the production engineer in order to program the plurality of modular machines on the line to manufacture a specific product. In particular, the software may generate a plan and/or part for each of the modular machines used to process the cable in order to manufacture the specific product. For example, the software may segment the tasks for manufacturing the specific product based on the plans and/or parts for each respective modular machine in the line. In this way, the software may generate the script (e.g., an XML document) that may be sent to the modular machines during production in order to manufacture the specific product.

Typically, more than one specific product may be manufactured on the line. In this regard, in one implementation, the software may organize different jobs (e.g., job A is to manufacture cable product A; job B is to manufacture cable product B; etc.) into a queue in order for the production operator to efficiently manage manufacturing of the different cable products.

Embodiments

FIG. 2A is an example of a cartridge shown in perspective view, with the cartridge holding a cable while processing using the one or more modular machines. As shown in FIG. 2A, the cartridge does not include a cable coiler thereon. Instead, the cable may be coiled (such as by coiling machine 120) prior to placement on the cartridge. In this regard, the base of the cartridge may not include cable coiler, such as illustrated in FIGS. 2A-C.

Further, as shown in FIGS. 2A-C, a left cable holder is configured to hold one end of the cable, and a right cable holder is configured to hold another end of the cable. The designation of "left" and "right" in terms of cable holders are merely for descriptive purposes. Thus, in one embodiment, both ends of cable are held in a respective cable holder. Alternatively, only one end of the cable may be held within a cable holder.

As discussed in further detail below, an external device, separate from the cartridge, may be moved relative to the cartridge in order to directly contact the cable and impart force to move the respective end of the cable toward or away from the modular machine (e.g., external rollers in FIGS. 2D-F may be moved into direct contact with the cable in order to impart force to the cable, thereby moving the cable).

Further, as shown in FIGS. 2A-C, the cartridge does not include rollers, with a respective end of the cable being held in the cartridge only through one connection (such as via pincers 215, 216, 217, 218).

In one implementation, pincers include a groove 274 shaped to mate with cable so that cable may be held by pincers 215, 216, 217, 218 without damaging cable. Pincers 215, 216, 217, 218 may be moved via a force on a piston, such as illustrated in FIGS. 2E-F. In this regard, it is contemplated to move pincers in a variety of manners with a variety of applied force(s).

A central controller, such as line control machine 531 (discussed below), may program one or more machines, such as one or more modular machine(s), as part of the setup process and before the cartridges arrives at the stopper for processing. For example, the central controller may send a plan for the specific modular machine, such as discussed in FIG. 5D.

Figure 9:
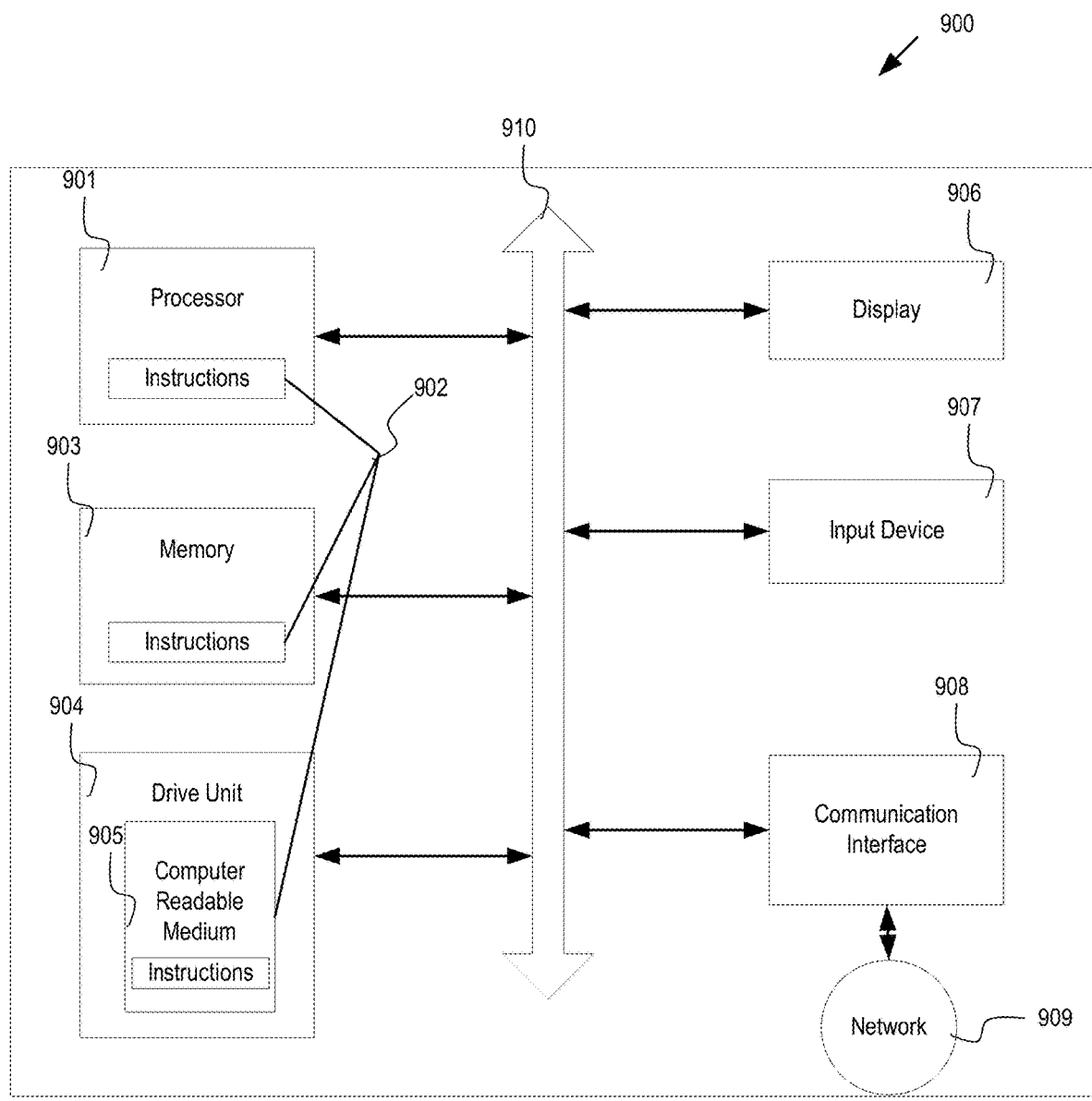
FIG. 9 illustrates a block diagram of exemplary computer architecture for any electronic device discussed herein.

FIG. 9 illustrates one example implementation of any electronic device disclosed herein, including computer system 900, or any other electronic device discussed herein, such as line control machine, line machines, feeder machines, or line control machine, discussed further below. In one implementation, any one, any combination, or all of the line machines, feeder machines, or line control machine may comprise computer system 900. Though the discussion below focuses on computer system 900, the below discussion may be equally applied to line machines, feeder machines, or line control machine.

For example, computer system 900 may include an ordered listing of a set of instructions 902 that may be executed to cause the computer system 900 to perform any one or more of the methods or computer-based functions disclosed herein, such as to control the processing of assembly of the cable housed in the cartridge. The computer system 900 may operate as a stand-alone device or may be connected, e.g., using the network 909, to other computer systems or peripheral devices, such as to one or more bar code readers, one or more actuators, one or more sensors, and one or more modular machines.

In a networked deployment, computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile computing device capable of executing a set of instructions 902 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions. As discussed herein, the instructions may be manifested in logic.

The computer system 900 may include a memory 903 on a bus 910 for communicating information. Code operable to cause the computer system to perform any of the acts or operations described herein may be stored in the memory 903. The memory 903 may be a random-access memory, read-only memory, programmable memory, hard disk drive or any other type of volatile or non-volatile memory or storage device.

The computer system 900 may include a processor 901, such as a central processing unit (CPU) and/or a graphics processing unit (GPU), such as discussed above. The processor 901 is one example of a controller (such as a digital controller) and may include one or more general processors, digital signal processors, application specific integrated circuits, field programmable gate arrays, digital circuits, optical circuits, analog circuits, combinations thereof, or other now known or later-developed devices for analyzing and processing data. The processor 901 may implement the set of instructions 902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 900 may also include a disk or optical drive unit 904. The disk drive unit 904 may include a computer-readable medium 905 in which one or more sets of instructions 902, e.g., software, can be embedded. Further, the instructions 902 may perform one or more of the operations as described herein. The instructions 902 may reside completely, or at least partially, within the memory 903 and/or within the processor 901 during execution by the computer system 900. Accordingly, the databases may be stored in the memory 903 and/or the disk unit 904.

The memory 903 and the processor 901 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 900 may include an input device 907, such as a keyboard or mouse, configured for a user to interact with any of the components of the computer system 900. An example of computer system 900 comprises the central controller. In this way, an operator may control the processing of the cable in the cartridge. It may further include a display 906, such as a liquid crystal display (LCD), a cathode ray tube (CRT), or any other display suitable for conveying information. The display may act as an interface for the user to see the functioning of the processor 901, or specifically as an interface with the software stored in the memory 903 or the drive unit 904. As discussed above, the customer-controlled device may include a display and an input device, such as input device 907.

The computer system 900 may include a communication interface 908 that enables communications via the communications network 909. The network 909 may include wired networks, wireless networks, or combinations thereof. The communication interface 908 network may enable communications via any number of communication standards, such as 802.11, 802.17, 802.20, WiMAX, 802.15.4, cellular telephone standards, or other communication standards, as discussed above. Merely because one of these standards is listed does not mean any one is preferred as any number of these standards may never actually be adopted in a commercial product.

Block diagrams of different aspects of the system may be implemented using the computer functionality disclosed herein and for control of the cartridge as discussed above. Further, the flow diagrams may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 3:
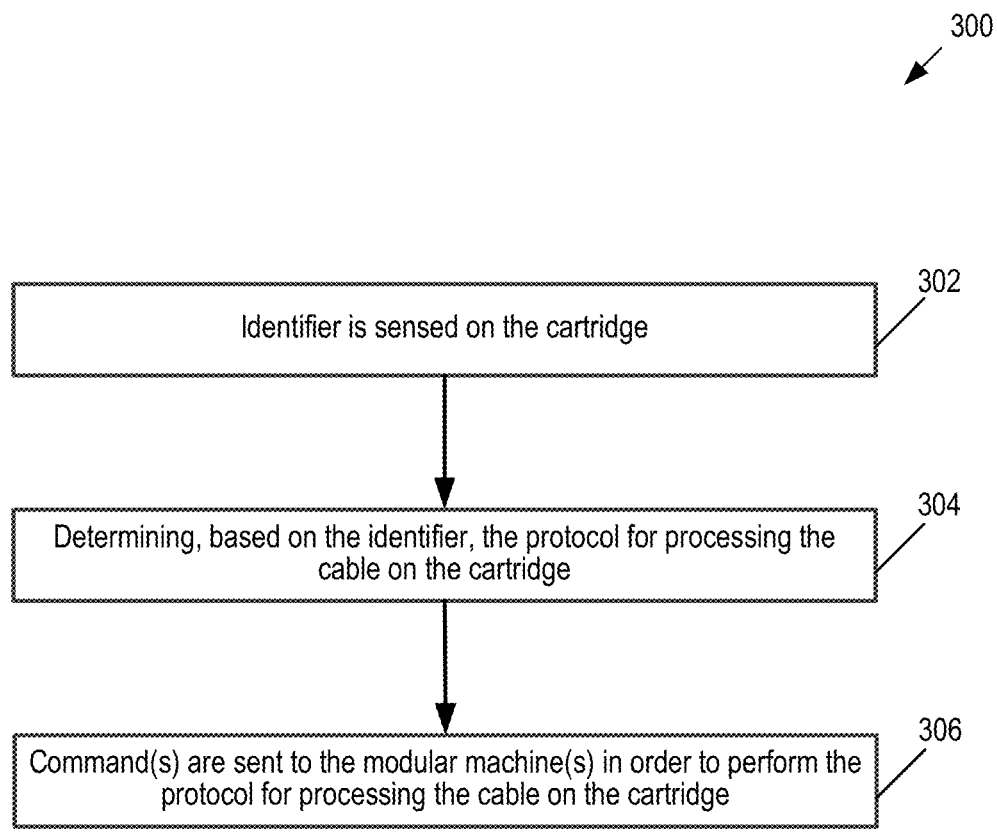
FIG. 3 is a flow chart for sensing an identifier (e.g., a barcode or RFID) on the cartridge and the processing of the cable on the cartridge based on the sensed identifier.

FIG. 3 is a flow chart 300 for sensing an identifier (e.g., a barcode or RFID) on the cartridge and the processing of the cable on the cartridge based on the sensed identifier. At 302, the identifier is sensed on the cartridge. The identifier may be indicative of any one, any combination, or all of: (1) a unique identifier for the cartridge; (2) a unique identifier for the plan (discussed below); (3) a unique identifier for the product (discussed below); or (4) a unique identifier for the job (discussed below). The identifier may be used by any one, any combination or all of the actuator, the modular machine, or the central controller. For example, a bar code reader may sense a bar code on the cartridge. After which, the sensed bar code may be transmitted to another device, such as central controller (discussed further below). At 304, the protocol for processing the cable on the cartridge is determined. For example, responsive to receipt of the bar code, a machine, such as a central controller (e.g., line control machine 531) or a line machine, may determine the protocol for processing the cable on the cartridge. The protocol may comprise commands for one or more of the modular machines. At 306, the commands are sent to the modular machine(s) in order to perform the protocol for processing the cable on the cartridge. For example, the central controller may send a first command to a first modular machine in order for the first modular machine to perform an operation on the cable. Alternatively, or in addition, the central controller may send a second command to a specific actuator in order for the specific actuator to perform an operation on the cable or on a part of the cartridge (such as moving an arm of the cartridge in order to move the cable toward the modular machine). In an alternate implementation, the bar code may be used by the modular machine in order for the modular machine to determine the protocol (e.g., the plan) to process the cable without real-time communication with the central controller. Alternatively, or in addition, the identifier may be used for tracking the processing of cables (e.g., for compiling of statistics), with the compiling of the statistics being performed by the modular machine (e.g., the modular machine obtains the unique identification of the cartridge, and transmits a communication to the central controller, with the communication indicative of the unique identification of the cartridge and the operation performed by the modular machine; the modular machine writes to the identifier the operation performed by the modular machine, with the central controller reading the identifier in order to compile statistics as to operations performed on the cable for the cartridge).

In one implementation, the identifier may comprise a read-only identifier. In practice, the identifier may be used by any or both of the actuator or modular machine in order to process the cartridge. In an alternate implementation, the identifier may comprise a read-write identifier. For example, the modular machine may write operations it has performed to the identifier in order to compile statistics, as discussed above. As another example, the modular machine may write an indication of the success and/or failure of the operation performed. In particular, in the event that the modular machine determines that there was a failure in performing the operation on the cable in the cartridge, the modular machine may write an indication of FAILURE on the identifier. Modular machines further down the line (e.g., modular machines that perform subsequent processing on the cable) may read the identifier, determine that the identifier is indicative of FAILURE, and in response thereto, determine not to perform any processing on the cable in the cartridge (e.g., determine not to perform any operation on either side of the cable). Further, the central controller may likewise read the identifier to determine the failure and compile statistics. In this way, the modular machine writing the indication of FAILURE onto the identifier removes the need for the modular machine to send a separate communication to the central controller and likewise removes the need for the modular machines further down the line communicating with the central controller to determine whether the cable on the cartridge is bad (and not subject to processing).

FIG. 2B is an implementation of the cartridge 200, shown in top view with one arm retracted and another arm extended. Cartridge 200 includes a flat portion 292 (which in one implementation includes a lip 293, 294, 295 around its perimeter shown in FIG. 2A and in a second implementation does not include a lip around its perimeter). The flat portion 292 may include one or more screws 221 to affix the flat portion 292 to the main section of the cartridge 200. One side of the flat portion 292 may include multiple curved sections shaped to accommodate a respective end of the cable traversing thereto. For example, the one side includes curved sections 203, 204 leading to exit 207, and curved sections 205, 206 leading to exit 208.

Cartridge 200 includes left arm structure (from the perspective of the top view), which includes a platform 209, a window 211 formed by one or more sides 213, pincers 215, 216 configured to hold the one end of the cable, and a comb 219 configured to hold one or more wires of the end of the cable. Similarly, right arm structure (from the perspective of the top view), which includes a platform 210, a window 212 formed by one or more sides 214, pincers 217, 218 configured to hold the one end of the cable, and a comb 220 configured to hold one or more wires of the end of the cable.

Thus, FIG. 2B illustrates a left cable holder movable portion includes platform 209, window 211, pincers 215, 216, and comb 219, which is configured to slide relative to the base 223 of the cartridge. In particular, left cable holder movable portion has affixed thereto a left sliding member (not shown) that is configured to slide within a mating portion resident in the base 223 of the cartridge. Likewise, a right cable holder movable portion includes platform 210, window 212, pincers 217, 218, and comb 220, which is configured to slide relative to the base 223 of the cartridge. In particular, right cable holder movable portion has affixed thereto a right sliding member (not shown) that is configured to slide within a mating portion resident in the base 223 of the cartridge.

As shown in FIG. 2B, the left arm structure is retracted with an end portion 201 of the left arm structure visible. In this regard, the left cable holder movable portion is slid backward relative to modular machine (not shown) whereas the right cable holder movable portion is slid forward relative to modular machine. Manners, other than sliding, in which to move right cable holder movable portion and left cable holder movable portion are contemplated. As discussed further below, the respective arm structures may be moved in the extended and/or retracted positions by applying a motive force onto a part of the respective arm structure, such as at a back, or a bottom of the respective arm structure. For example, the respective arm structure may receive a motive force underneath (such as on end portion 201) or to the side of the cartridge underneath the flat portion 292. In this way, the actuator, which may include a piston, may actuate the piston so that the piston moves underneath flat portion 292.

Base 223 may comprise a platform and may be connected to a conveyor, which is configured to move the cartridge from station to station (e.g., from a first machine at a first station to a second machine at a second station). As one example, in a pallet-based conveyor system, an actuator may reengage the pallet connected to cartridge (e.g., which may include a platform). In this way, the cartridge may move along conveyor until pallet connected to cartridge hits a stopper and is positioned at a respective station. After which, the actuator may actuate a piston, thereby moving left cable holder movable portion 107 toward modular machine.

FIG. 2C is identical to FIG. 2B with a pre-coiled cable 225 placed on the cartridge 200. As shown, pre-coiled cable 225 includes a circular section 226 connecting between a first loose end 230 (via section 228) and a second loose end 229 (via section 227). As shown, circular section 226 with radius 231 comprising at least an entire revolution of the cable. Alternatively, the circular section 226 may include multiple revolutions of the cable.

Flat portion 292 may be configured to receive different length cables, such as cables having a single revolution, cables have multiple revolutions, and cables have no revolutions. FIG. 2A illustrates that different radii of coiled cable may be placed in flat portion 292, such as circular sections have smaller or larger radii than that depicted in FIG. 2A. In this regard, coiling machine 120 may coil the cut unprocessed cable into different radii circular sections and different numbers of revolutions prior to placement by cartridge-loading machine 130 onto the cartridge 290.

As discussed above, the unprocessed cable may include in one implementation a circular section 226 and in another implementation no circular section. In the latter instance where there are no revolutions (e.g., no circular section), the unprocessed cable may include a middle section (uncoiled) which is at least a minimum distance, such as 200-300 millimeters, in order for the respective arms to extend. In this way, the cartridge may accommodate a large variety of lengths of cables for processing.

FIG. 2D illustrates a front perspective view 235 of the second implementation of the cartridge, with one cable end 230 being extended or retracted, relative to the platform 209 of the respective arm, using one or more external rollers. FIG. 2D illustrates structure 245 and structure 243. Structure 245 is configured to perform one or more functions including: (1) imparting force onto the cable in order to retract/extend the cable end; and/or (2) apply a force to the respective arm (such as to a part of platform 209) in order to stabilize the respective arm when pincers 215, 216 are released. Structure 243 is configured to perform one or more functions including: (1) apply a force to the cable in order to provide a backing when roller 247 imparts force onto the cable; and/or (2) apply a force in order to release pincers 215, 216. Structure 245 is positioned above (relative to cable) structure 243. Alternatively, structure 245 may be positioned below structure 243. In still an alternate embodiment, structure 243, 245 may be to the right/left of the cable (instead of bottom/top as illustrated in FIG. 2D). In this embodiment, the rollers, 238, 247, are positioned to the right of the cable and contact the cable on the right/left sides of the cable. In this regard, the structures 243, 245 (and associated rollers 238, 247) may be positioned at opposite sides of the cable (e.g., at 180° to each other), including top/bottom (e.g., 90°/270°); right/left (e.g., 0°/180°); upper right/lower left (e.g., 45°/225°); lower right/upper left (e.g., 315°/135°); or the like. Thus, any discussion regarding top/bottom for rollers 238, 247 may be applied to any configuration that is moved to and directly physically contacts the cable on opposing sides of the cable.

Structure 245 includes platform 246 onto which roller 247 is supported. Roller 247 includes a surface 248 which may be a gripping surface such that roller 247 may comprises a friction roller configured to impart force onto the cable upon contact. Structure 245 includes a motor (not shown) which may move roller 247 in a clockwise or a counterclockwise direction. Likewise, roller 238 may include a surface 239 which may be shaped to engage with the cable, such as being shaped as a groove, in order to contact additional surface area on the cable. When roller 247 is moved in a clockwise direction, end 230 of cable is retracted. Conversely, when roller 247 is moved in a counterclockwise direction end 230 of cable is extended.

FIG. 2D further illustrates structure 243, which includes one or more pistons 240, 241, 242 which raises a platform on which rolling structure 236 sits. As discussed further below with regard to FIGS. 2E-F, structure 243 causes pincers 215, 216 to be released and raises rolling structure 236 in order for roller 238, connected by bracket 237 on rolling structure 236, to move into contact with the cable. In this way, roller 238 may comprise a free-wheeling roller configured not to be moved by a roller (e.g., a non-driven roller that is not directly driven by a motor or the like); instead, roller 238 moves freely based on motive force imparted by roller 247 (e.g., the driven roller) onto cable, which in turn moves roller 238. In this way, roller 238 (physically contacting the opposite of the cable to the physical position contacted by roller 247) is positioned to back cable when roller 247 applies force onto the cable.

In one implementation, structure 245 may further include one or more sensors (shown as 287 in FIG. 2H for sensing end of cable 288) which are configured to sense the loose end 229, 230 in order to determine how many revolutions (or how many fractions of a revolution) to move friction roller 247. In particular, responsive to the structure 245 determining a location of the loose end, the structure 245 may determine an amount for the loose end to retract or extend, and based on the determined amount, determining a control for the motor for friction roller 247 in order to impart the determined amount. In this way, the actuator may be configured to control an amount of rotation of the driven roller, in spooling an end of the cable toward the machine, such as based on the location of the end of the cable.

FIG. 2E illustrates a side view 255 of the second implementation of the cartridge, prior to the external rollers 247, 238 contacting one loose end 230 of the cable in order to extend or retract, relative to the respective arm, the loose end 230. FIG. 2F illustrates the side view 265 of the second implementation of the cartridge, with the external rollers 247, 238 contacting the loose end 230 of the cable in order to extend or retract, relative to the respective arm, the loose end 230.

Structure 243 includes a contact 260 with a contact surface 258. As illustrated in FIGS. 2E-F, structure 243 moves upward to contact the cartridge. In particular, contact surface 258 contacts contact surface 257 of piston 256, imparting force onto piston 256, thereby releasing pincers 215, 216. In this way, piston 256 is an example of a rigid structure Because a force is applied to piston 256, in order to prevent or reduce bending of platform 209 of the cartridge, another force is applied on the opposite side of the platform. For example, hook 249 may include contact surface 259, which contacts the opposite side of the platform. In this way, hook 249 may stabilize platform 209 when the pincers 215, 216 are being released. In particular, the movable portion, which may include the platform, has a force applied to a first part of it via piston 256. In order to reduce potential bending to the platform, contact surface 259 contacts the opposite side of the platform.

Further, as shown in FIGS. 2E-F, structure 243 moves upward such that at least a part of rolling structure 236, including at least a part of roller 238, is moved through window 211 in order to contact cable.

Thus, in practice, responsive an indication that the cartridge is at a respective station, the actuator may be configured to receive one or more communications indicative of moving the driven roller and the non-driven roller into contact with the cable and of driving the driven roller to spool an end of the cable (such as the first end or the second end of the cable) toward the machine. The machine may perform one or more operations on the cable, such as discussed above. After which, the machine may transmit one or more communications indicative that the machine has performed one or more operations on the cable. For example, the machine may transmit the one or more communications, which may be an indication that the machine has completed at least a part of its processing on the cable, directly to the actuator or routed via the central controller (with the central controller sending a communication to the actuator to spool the end of the cable backward). In either instance, the actuator receives communication(s) indicative of driving the driven roller to spool the at least one of the first end or the second end of the cable away from the machine and moving the driven roller and the non-driven roller away from the cable to remove contact with the cable.

Figure 2G:
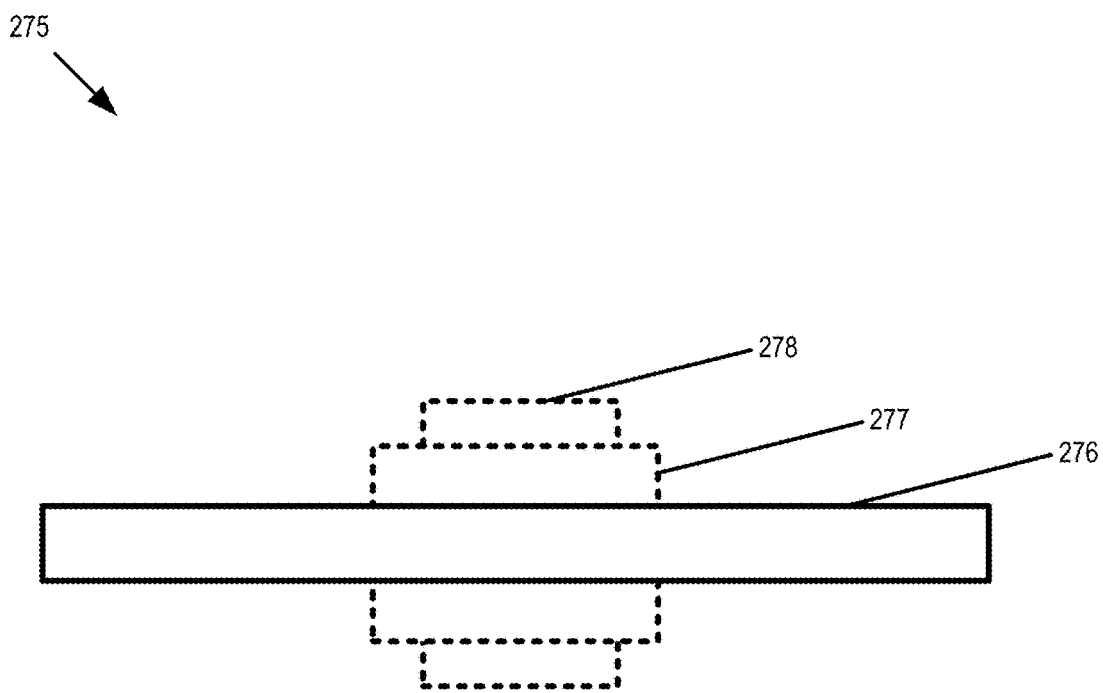
FIG. 2G illustrates the rotation of the roller relative to cable.
Figure 2H:
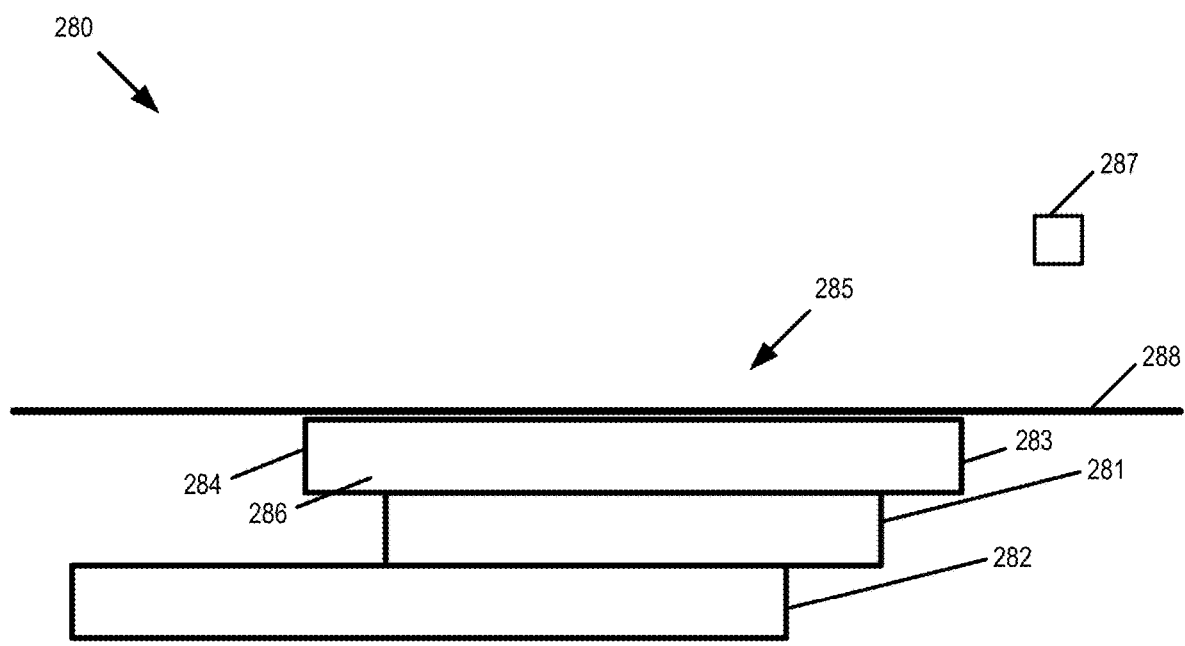
FIG. 2H illustrates the slide mating portion of the base and the sliding member of the movable portion.

Alternatively, or in addition, roller 247 and roller 238 may be turned or twisted 90 degrees. In this way, roller 247 and roller 238 may be moved longitudinally in order to impart a different type of force (e.g., a rotational force) onto the cable. In this way, imparting a rotational force via roller 247 (with roller 238 stationary), an end of the cable may be rotated. For example, FIG. 2G is an illustration 275 the rotation of the roller 247, 238 relative to cable 276, with position 277 of roller 247, 238 for spooling and position 278 of roller 247, 238 (at which the roller 247, 238 are 90° rotated from position 277) for rotating an end of the cable. Thus, when the driven roller is rotated and then driven, the driven roller imparts a rotational force on an end of the cable. In this implementation, window 211, 212 are made large enough in order for roller 247 to pass therethrough. FIG. 2H is an illustration 280 of a movable portion 285, which may include a platform 286, and a sliding member 281 (for engaging and sliding along sliding mating portion 282 of the base (such as base 223), with the platform including a first end 283 and a second end 284. As discussed above, the platform 286, which may comprise platform 209, 210, includes a window, such as window 211, 212. Further, the window may be closer to first end 283 than to second end 284. Alternatively, or in addition, in moving movable portion 285, first end 283 is positioned closer to the respective machine used to process the first end of the cable held within movable portion 285.

Figure 4A:
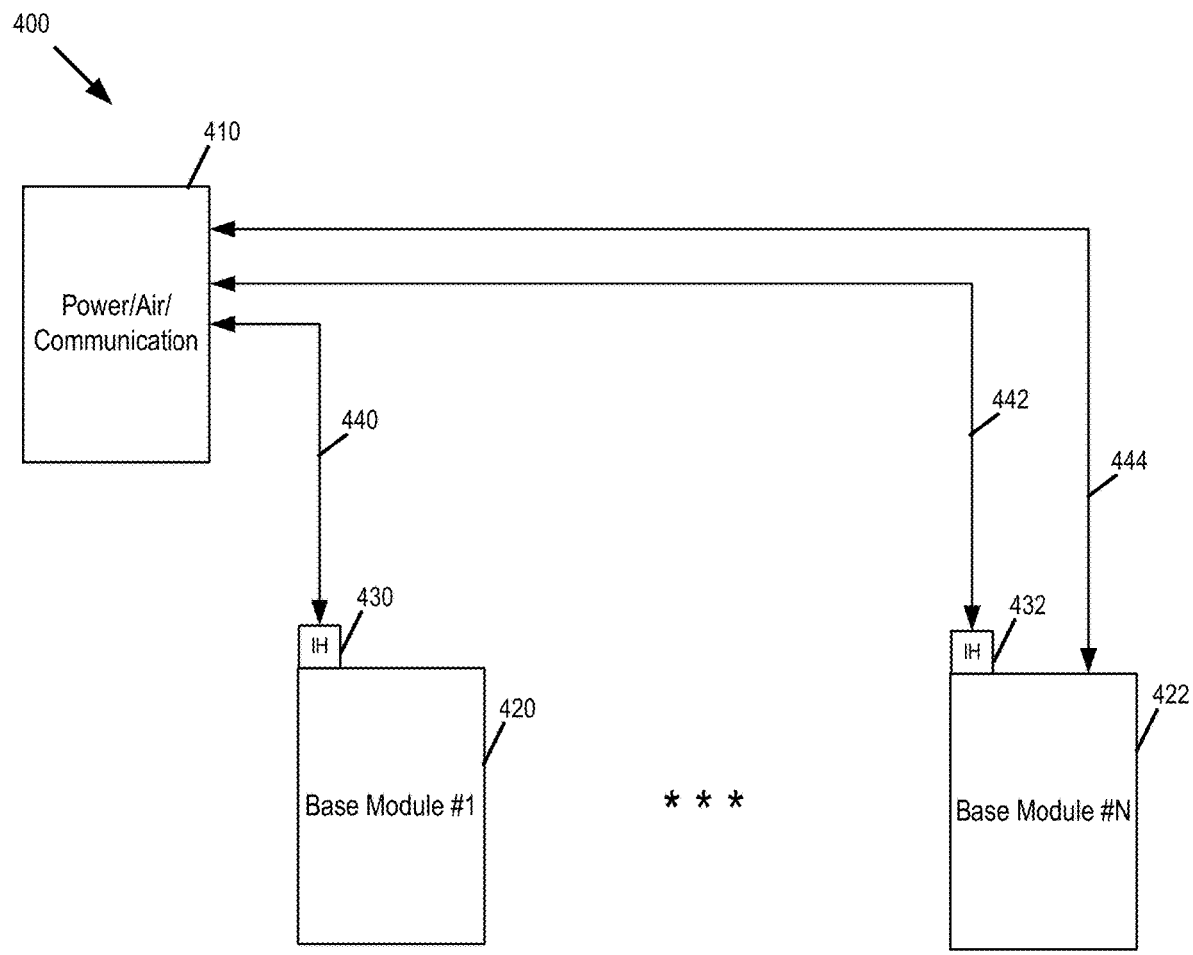
FIG. 4A illustrates a block diagram of series of base modules in which the line machines may reside.

FIG. 4A illustrates a block diagram 400 of series of base modules 420, 422 in which the line machines may reside. The base modules 420, 422 include a respective interconnection hub (IH) 430, 432. Further, various functions supplied to the base modules 420, 422, such as power, compressed air, and network capability may be supplied by power/air/communication block 410. As shown, different base modules may need different functions, and may be supplied via various lines 440, 442, 444 to the base modules 420, 422 as needed.

Figure 4B:
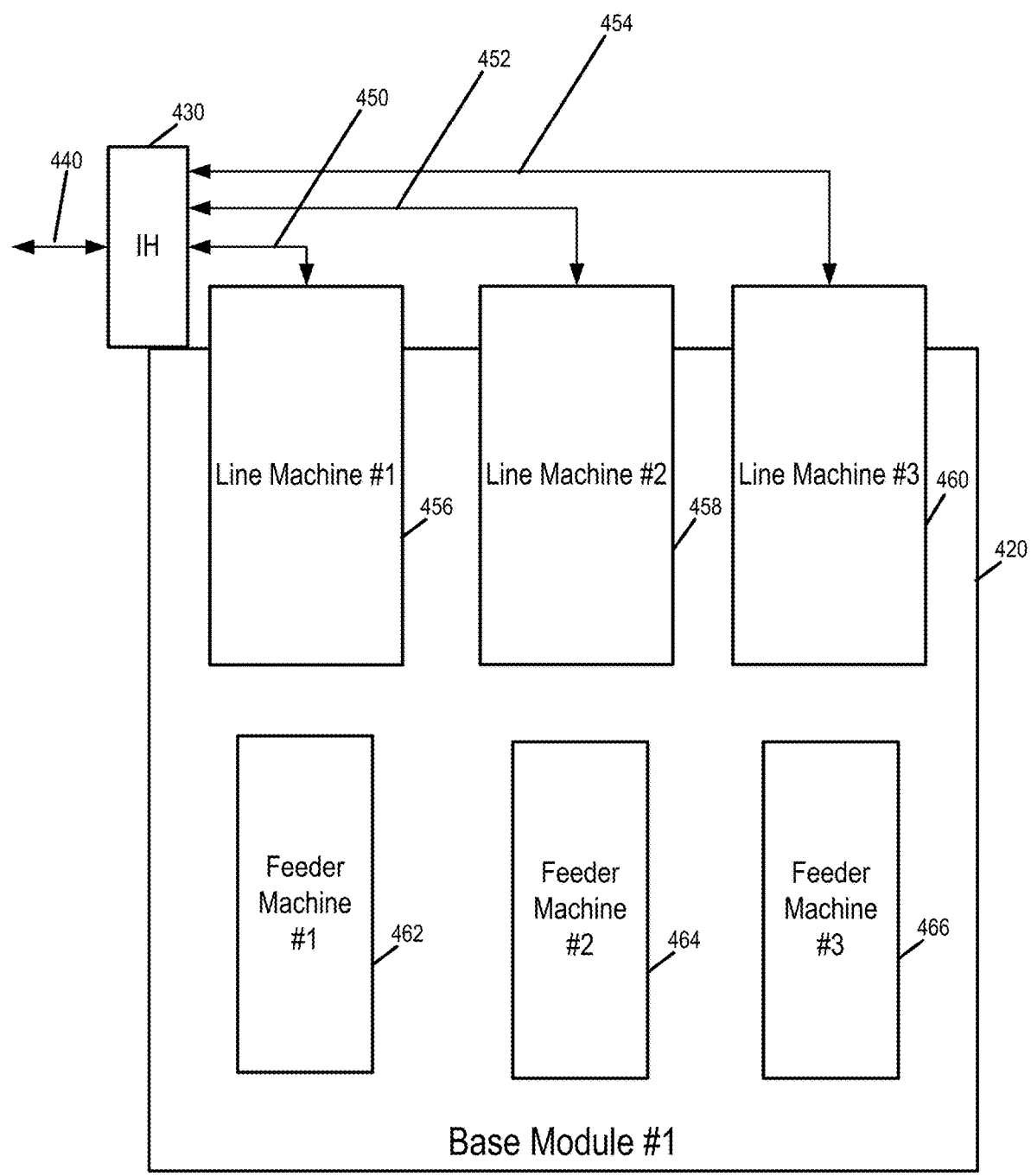
FIG. 4B illustrates a block diagram of one base module with line machines and feeder machines within.

FIG. 4B illustrates a block diagram of one base module (base module #1 420) with line machines (line machine #1 (456), line machine #2 (458), and line machine #3 (460)) and feeder machines (feeder machine #1 (462), feeder machine #2 (464), and feeder machine #3 (466)) within. As shown, there are three pairs of line machines and feeder machines in a respective base module. Fewer or greater numbers of pairs of line machines and feeder machines may be within the respective base module. Further, lines 450, 452, 454 may feed the various functions, such as any one, any combination, or all of power, compressed air, and network capability. The configuration of a respective base module, with the ability to include multiple paired line machines/feeder machines, allows for flexible configuration of the automated line. As one example, due to the IH, connections may be simplified (with the connections to the respective base module of the various functions) and with the respective base modules routing the needed functions to the pairs of line machines/feeder machines.

In practice, the line control machine distributes subprocesses to the respective line machines tasked with performing the subprocesses. In turn, the line machine may send control commands to its respective feeder machine(s). The commands may be sent in one of two ways including: (1) pre-programming the feeder machine prior to receiving the pallet (e.g., when the feeder receives the pallet, the feeder is commanded to perform certain actions); or (2) the feeder machine receives commands in real-time from the line machine (e.g., responsive to the feeder machine receive an indication that the pallet has arrived at the station, the feeder machine sends a notification to its respective line machine; in turn, the respective line machine sends one or more commands to the feeder machine to perform in real time). As discussed above, when the line machine completes its operations on the cable, the line machine sends a command to the feeder machine to retract the cable holder (and optionally to retract the cable). For example, the line machine may comprise a wire stripper. Thus, the line control machine may instruct the wire stripper to strip 1 inch from the end of each side of the cable. In turn, the feeder may be commanded (either in real time or preprogrammed) to spool the end of the cable toward the wire stripper by 2 inches. After the wire stripper completes the wire stripping, the wire stripper may send a command to the feeder to retract the end of the cable.

Figure 4C:
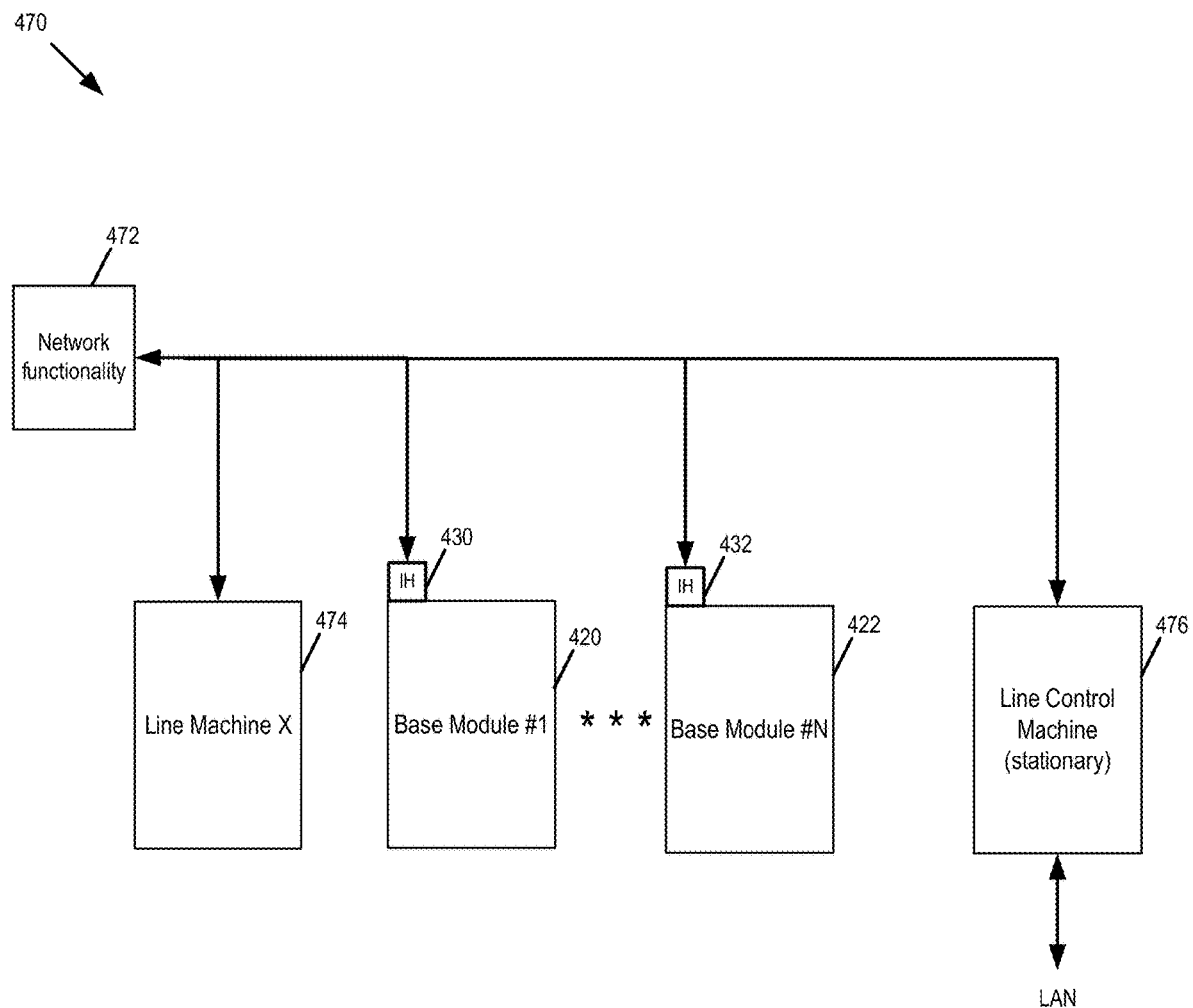
FIG. 4C illustrates a block diagram of a line control machine, base modules and a line machine.

FIG. 4C illustrates a block diagram 470 of a line control machine 476, base modules (base module #1 (420) to base module #N (422)) and a line machine (line machine X (474)) communicating via network functionality. As shown, the line control machine 476 may be configured to determine the protocol (as discussed above), and to transmit the various line machines (including those that are within a respective base module) or are directly connected to the network. In this regard, the configuration of the system is flexible in that the line machine may be directly connected to the network or within a respective base module (and communicating via IH 430, 432). Further, the line control machine 476 may be configured to identify an alert (whether independently determined by the line control machine 476 or received from one of the line machines), and command the line machines to enter safe mode. In turn, the line machines may command their respective feeders to enter safe mode as well. For example, each of the line machines and the line control machine 476 may cause the remaining machines to enter the safe mode (either directly by communicating line machine to line machine or indirectly by communicating with the line control machine 476 and with the line control machine 476 routing the alert). In this regard, the line control machine 476 may be configured to perform any one, any combination, or all of: (1) accepting jobs; (2) setting up the line machines; (3) generating statistics; and (4) addressing alerts.

Figure 4D:
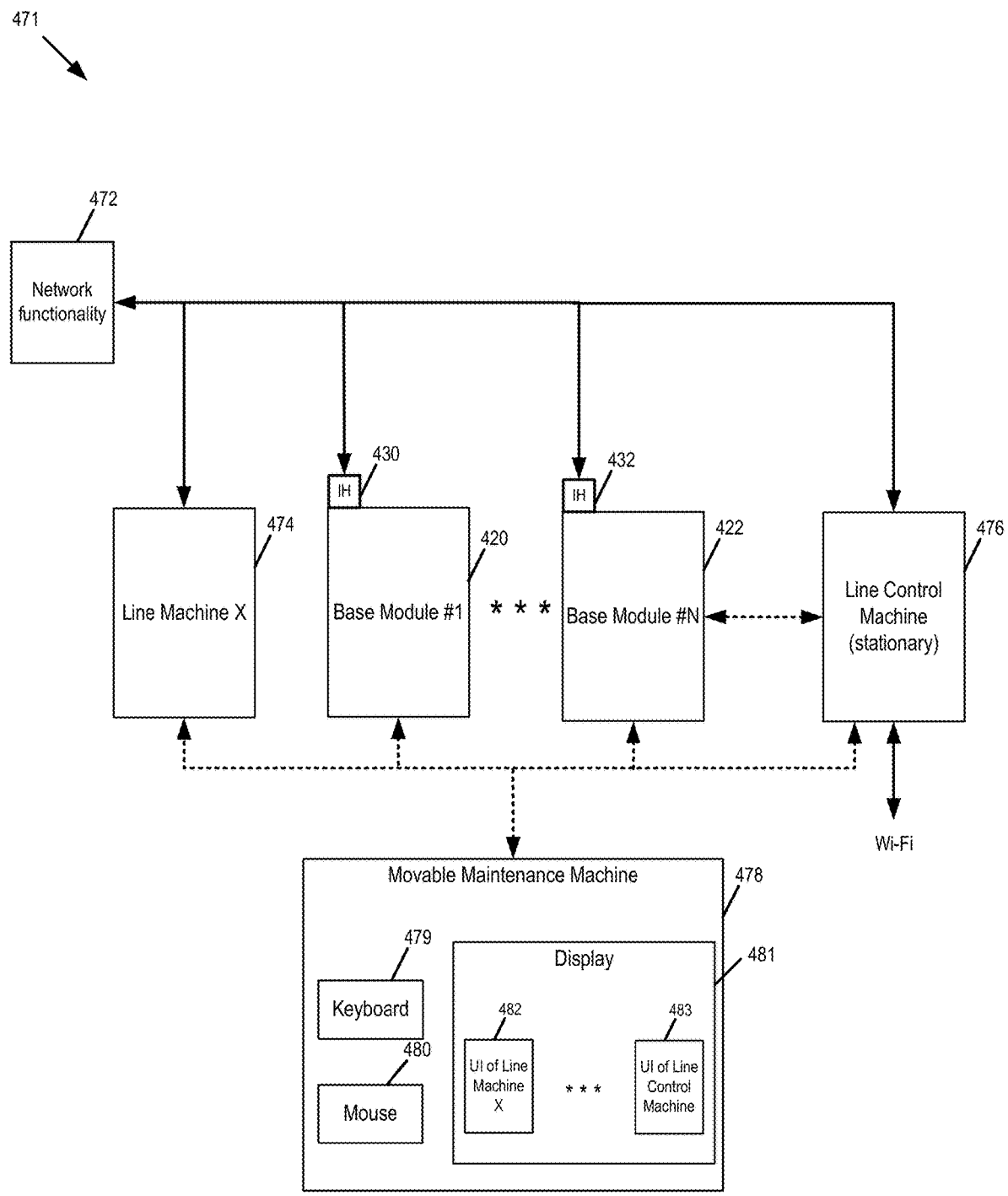
FIG. 4D illustrates a block diagram of a line control machine, base modules, a line machine, and a movable maintenance machine.

FIG. 4D illustrates a block diagram 471 of a line control machine 476, (base module #1 (420) to base module #N (422)), a line machine (line machine X (474)), and a movable maintenance machine 478. As shown, movable maintenance machine 478, which may comprise a trolley, is configured to be moved to any one of the base modules, the line machine, or the line control machine 476 (as represented by the dotted lines). In this regard, separate from the stationary line control machine 476, the movable maintenance machine 478 may be physically moved to various parts of the line (including one or both of the standalone line machines or a base module), thereby creating additional flexibility in configuring and/or controlling the line. Specifically, the trolley may be connected directly to any machine on the line, operating locally, with the trolley generating a user interface indicative of the status or control of the locally-connected machine. For example, using the "team viewer" on the trolley, the trolley may connect to a line machine and perform low-level activities that are unavailable through the line control machine. In particular, the trolley may connect with multiple machines on the line simultaneously (e.g., the line control machine and one, some, or all of the line machines) by opening up separate instances of the "team" viewer for each of the machines on the line. Further, in one or some embodiments, the trolley may only have minimal software, including the ability to access the machines on the line, in order to connect and use the software resident on the connected machines (instead of having software native on the trolley). Alternatively, or in addition, the trolley may assume control of remote computers, such as line control machine 476 or any line machine not directly connected to in. Specifically, the trolley may enter an address/password and assume remote control. In this regard, the trolley may function as an available interface that connects to the line (such as via the network functionality 472 or locally) and may assume the status as the line controller.

The movable maintenance machine 478 may include separate computing functionality including a processor (not shown), a keyboard 479, a mouse 480, and a display 481. Further, the display may include one or more user interfaces (UIs), such as a UI of line machine X 482 and UI of line control machine 483. In this regard, the UIs may be used to examine the status of the respective machine and/or to control the respective machine.

Figure 5A:
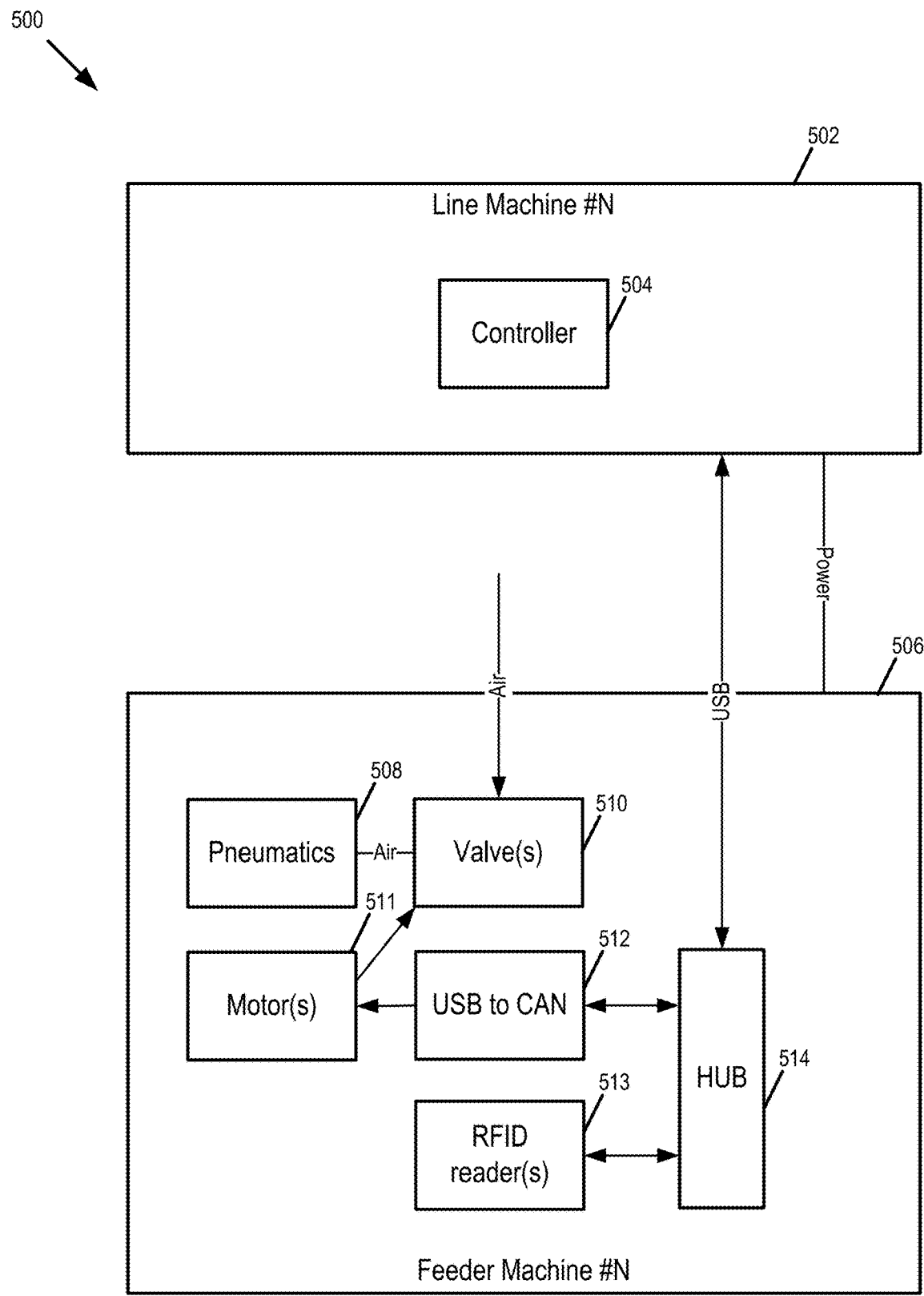
FIG. 5A illustrates a block diagram with a line machine and a feeder machine, in which the line machine includes a controller and the feeder machine does not include a controller.
Figure 5B:
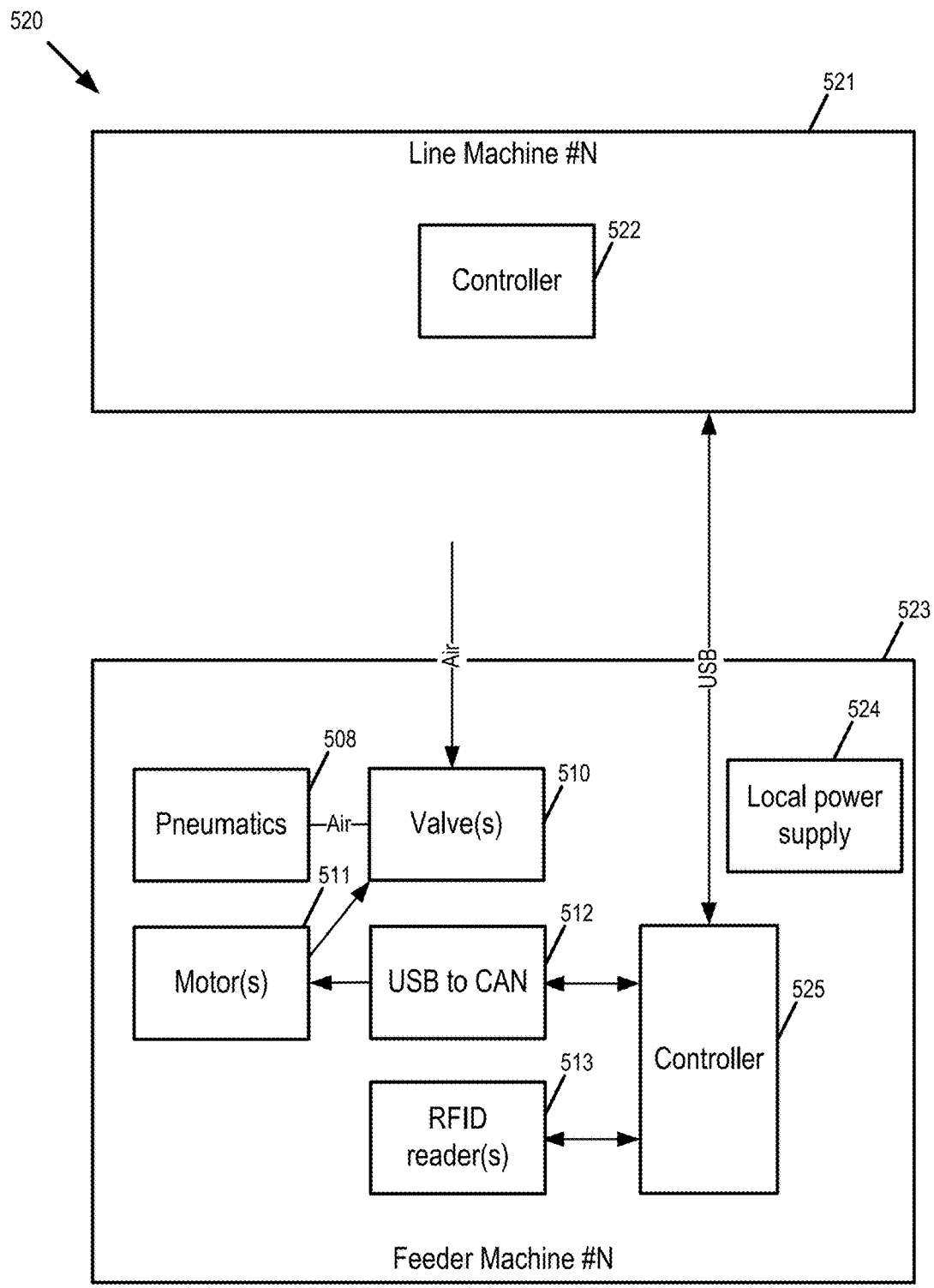
FIG. 5B illustrates a block diagram with a line machine and a feeder machine, in which both the line machine and the feeder machine include respective controllers.

As discussed above, the line machine and the feeder machine may be paired. Various configurations of the line machine-feeder machine are contemplated, such as illustrated in FIGS. 5A-B. In particular, FIG. 5A illustrates a block diagram 500 with a line machine #N (502) and a feeder machine #N (506), in which the line machine #N (502) includes a controller 504 and the feeder machine #N (506) does not include a controller. In this regard, feeder machine includes various functions, such as pneumatics 508 supplying air to operate valve(s) 510, motor(s) 511, and RFID reader(s) 513. As shown, control, such as in the form of lines for air, power and communication (via USB) are supplied from the line machine #N (502) to the feeder machine #N (506). For example, commands may be sent via USB to HUB 514, and routed via USB to CAN 512 in order to control motor(s) 511. Similarly, commands to and data from RFID reader(s) 513 may be routed via HUB 514. Further, air supplied by line machine #N (502) to valve(s) 510 may be used to control pneumatics 508. In that regard, FIG. 5A illustrates that line machine #N (502) may issue commands directly to the feeder machine #N (506) without an intermediary controller present on the feeder machine #N (506).

FIG. 5B illustrates a block diagram 520 with line machine #N (521) and feeder machine #N (523), in which both the line machine #N (521) and the feeder machine #N (523) include respective controllers (controller 522, controller 525). Communications, such as via USB may still be supplied and routed to controller 525 resident on the feeder machine #N (523), and air may be supplied. However, local power supply 524 may supply power to the feeder machine #N (523). Alternatively, the feeder machine #N (523) may receive power from the line machine #N (521).

Thus, instructions may be routed from the line machine #N (521) to the controller 525 of the feeder machine #N (523). In this regard, the controller may include software (such as firmware, so that the feeder machine #N (523) may include more intelligence in determining control of itself. In this way, the configuration depicted in FIG. 5B is a distribution of intelligence, with some residing in the line machine #N (521) and some residing in the feeder machine #N (523). Further, the feeder machine #N (523) may be more modular due to the intelligence residing therein.

Figure 5C:
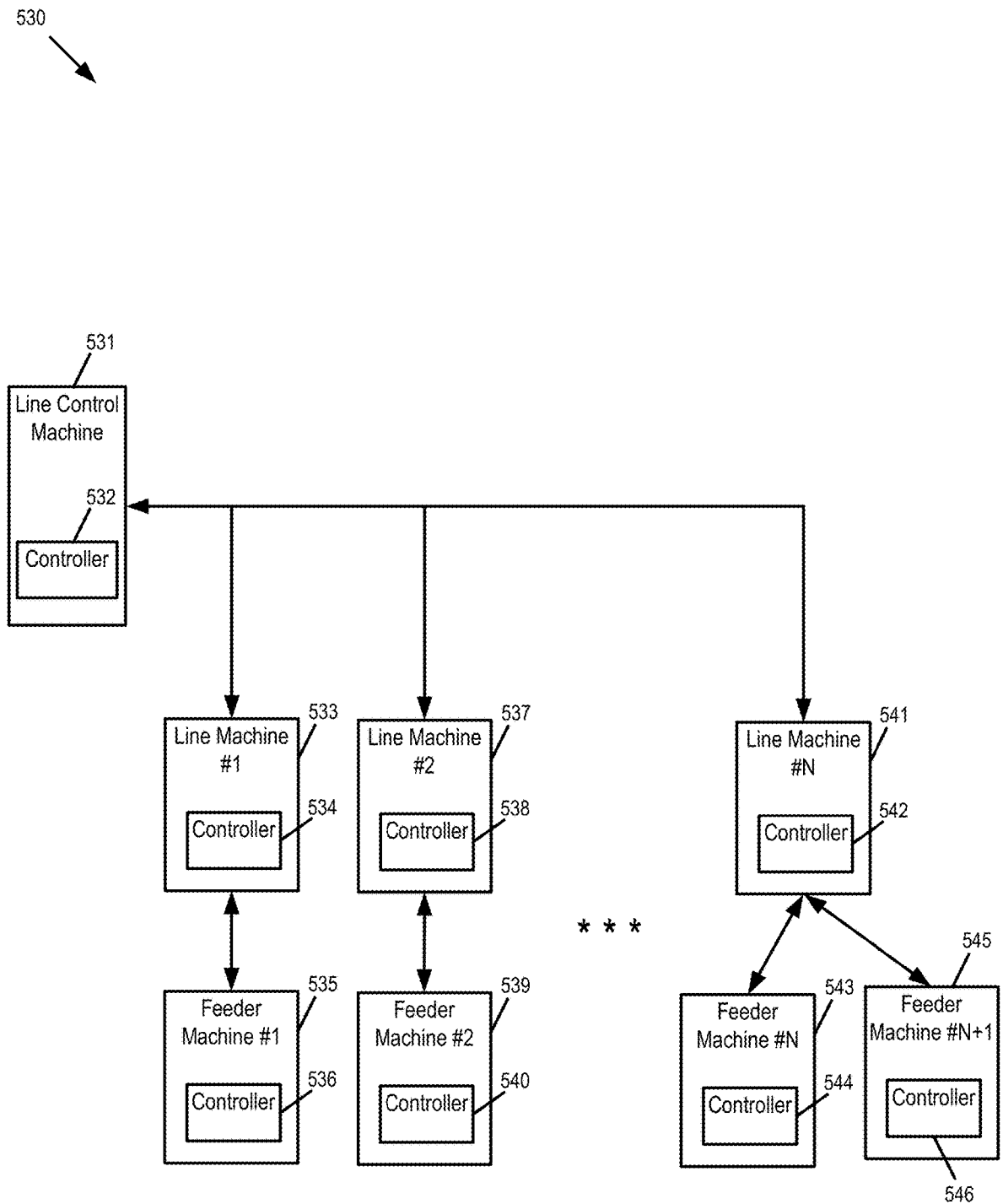
FIG. 5C illustrates a block diagram with a line control machine, multiple line machines and respective feeder machine(s), in which both the line machine and the feeder machine include respective controllers.

FIG. 5C illustrates a block diagram 530 with a line control machine 531 (with controller 532), multiple line machines (line machine #1 (533); line machine #1 (537); and line machine #N (541)) and respective feeder machine(s) (feeder machine #1 (535); feeder machine #2 (539); feeder machine #N (543); feeder machine #N+1 (545)), in which both the line machine and the feeder machine include respective controllers (including controllers 534, 536, 538, 540, 542, 544, 546). As shown, a line machine and a feeder machine may be paired one-to-one. Alternatively, or in addition, the line machine may be paired to multiple feeder machines, such as one-to-many (e.g., one-to-two, one-to-three, one-to-four, etc.). As one example, a test machine, which may be at the end of the line, inputs both sides of the cable therein so that both sides of the cable are inside the machine simultaneously and tested. In that regard, two feeder machines are use. In one implementation, the line control machine 531 is insulated from the feeder machines, sending the plan for operation to the line machine (e.g., line machine #N (541)). In turn, line machine #N (541) may control the feeder machine(s). In this regard, line machine #N (541) acts as the mediator between the line control machine 531 and the feeder machines.

Thus, there are various options in which the line machine may control its respective feeder machine(s) including: (1) the line machine directly controlling the feeder machine; (2) the line machine communicating with the controller that is attached to the feeder machine; or the line machine communicating through the network, with the communication ultimately received by a controller that controls multiple feeders (e.g., module unit, discussed below).

Figure 5D:
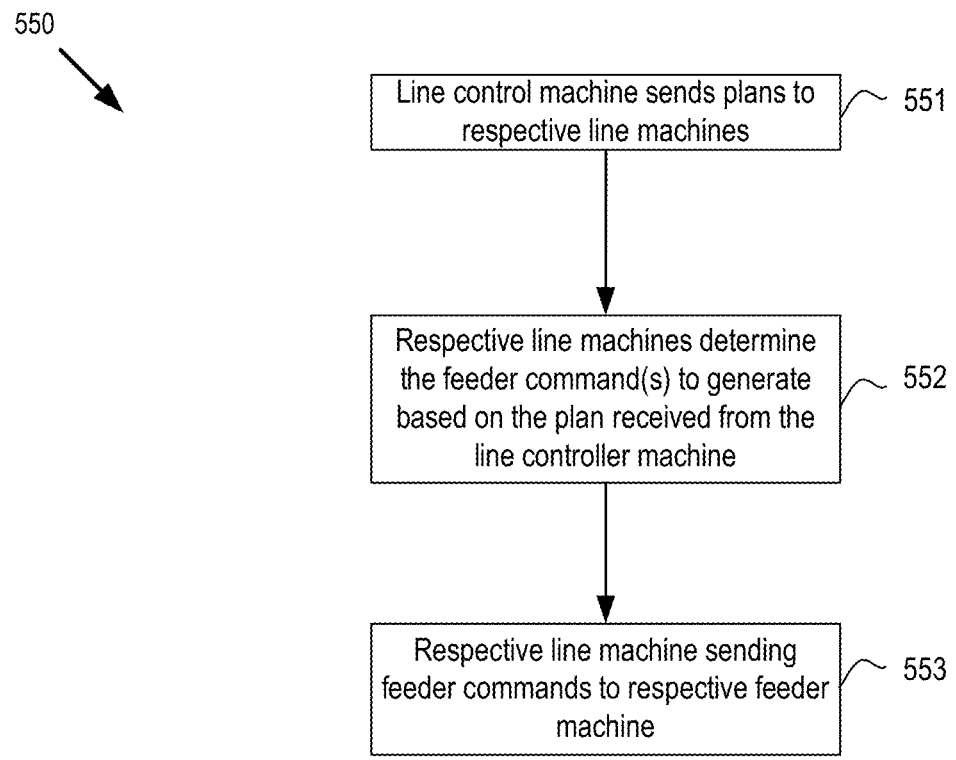
FIG. 5D is a flow chart of the line control machine sending the plan to the respective line machines in order for the respective line machines to perform the operations required to process the cable.

FIG. 5D is a flow chart 550 of the line control machine sending the plan to the respective line machines in order for the respective line machines to perform the operations required to process the cable. At 551, the line control machine sends plans to respective line machines. At 552, the respective line machines determine the feeder command(s) to generate based on the plan received from the line controller machine. At 553, the respective line machine sending feeder commands to respective feeder machine.

Figure 5E:
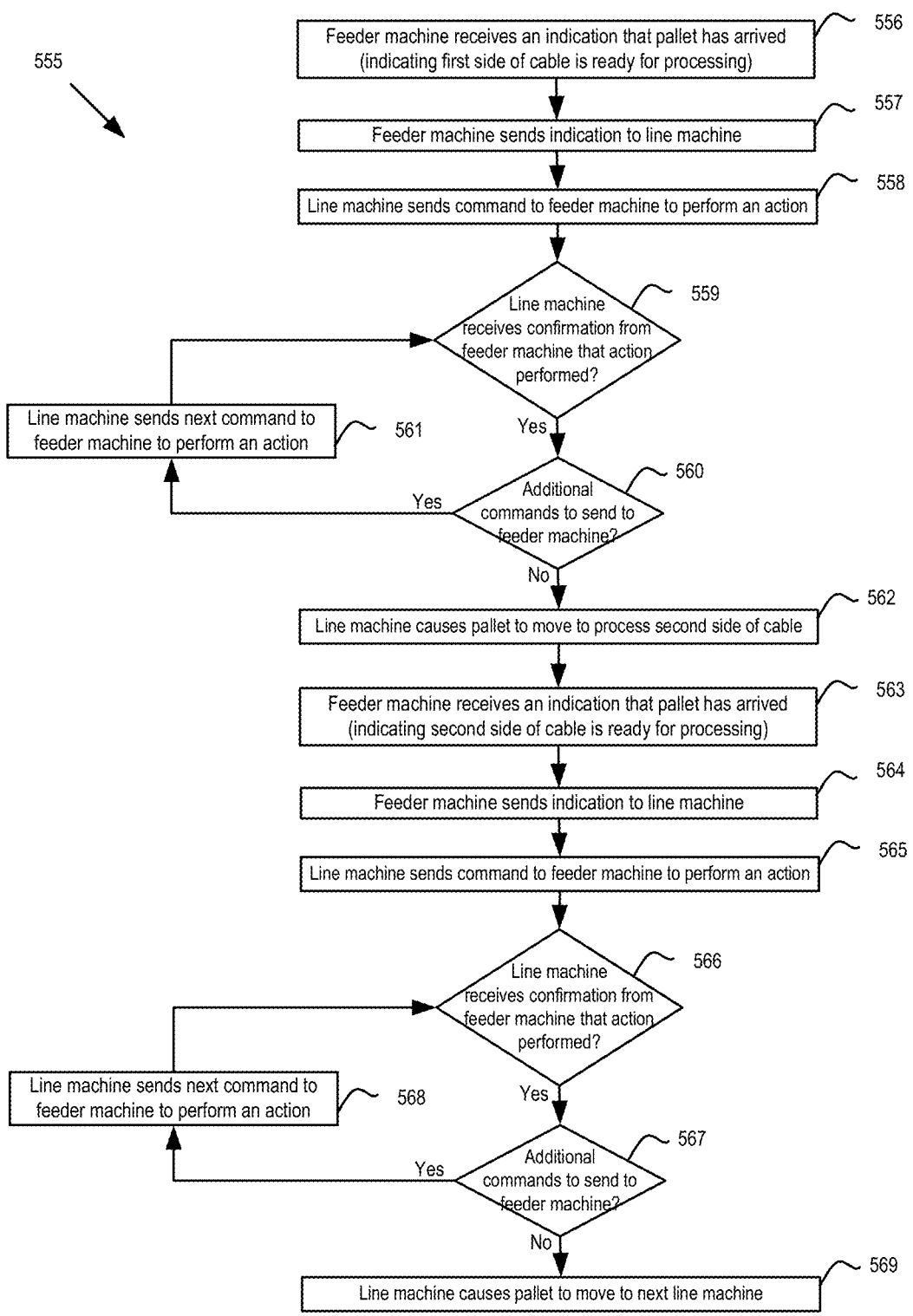
FIG. 5E is a flow chart of the line machine sending commands to the feeder machine in order to implement the plan that was received by the line machine from the line control machine.

FIG. 5E is a flow chart 555 of the line machine sending commands to the feeder machine in order to implement the plan that was received by the line machine from the line control machine. At 556, the feeder machine receives an indication that pallet has arrived (e.g., indicating first side of cable is ready for processing). At 557, the feeder machine sends an indication to line machine. Responsive to receiving the indication, at 558, the line machine sends command to feeder machine to perform an action. At 559, the line machine determines whether it has received confirmation from feeder machine that action performed. If so, at 560, the line machine determines whether there are additional commands to send to feeder machine. If so, at 561, the line machine sends next command to feeder machine to perform an action and loops back to 559. If not, at 562, the line machine causes pallet to move to process second side of cable.

At 563, the feeder machine receives an indication that pallet has arrived (e.g., indicating second side of cable is ready for processing). At 564, the feeder machine sends the indication to line machine. Responsive to receiving the indication, at 565, the line machine sends one or more commands to feeder machine to perform an action. At 566, the line machine determines whether it has received confirmation from feeder machine that action performed. If so, at 567, the line machine determines whether there are additional commands to send to feeder machine. If so, at 568, the line machine sends next command to feeder machine to perform an action and loops back to 566. If not, at 569, the line machine causes the pallet to move to next line machine.

Figure 5F:
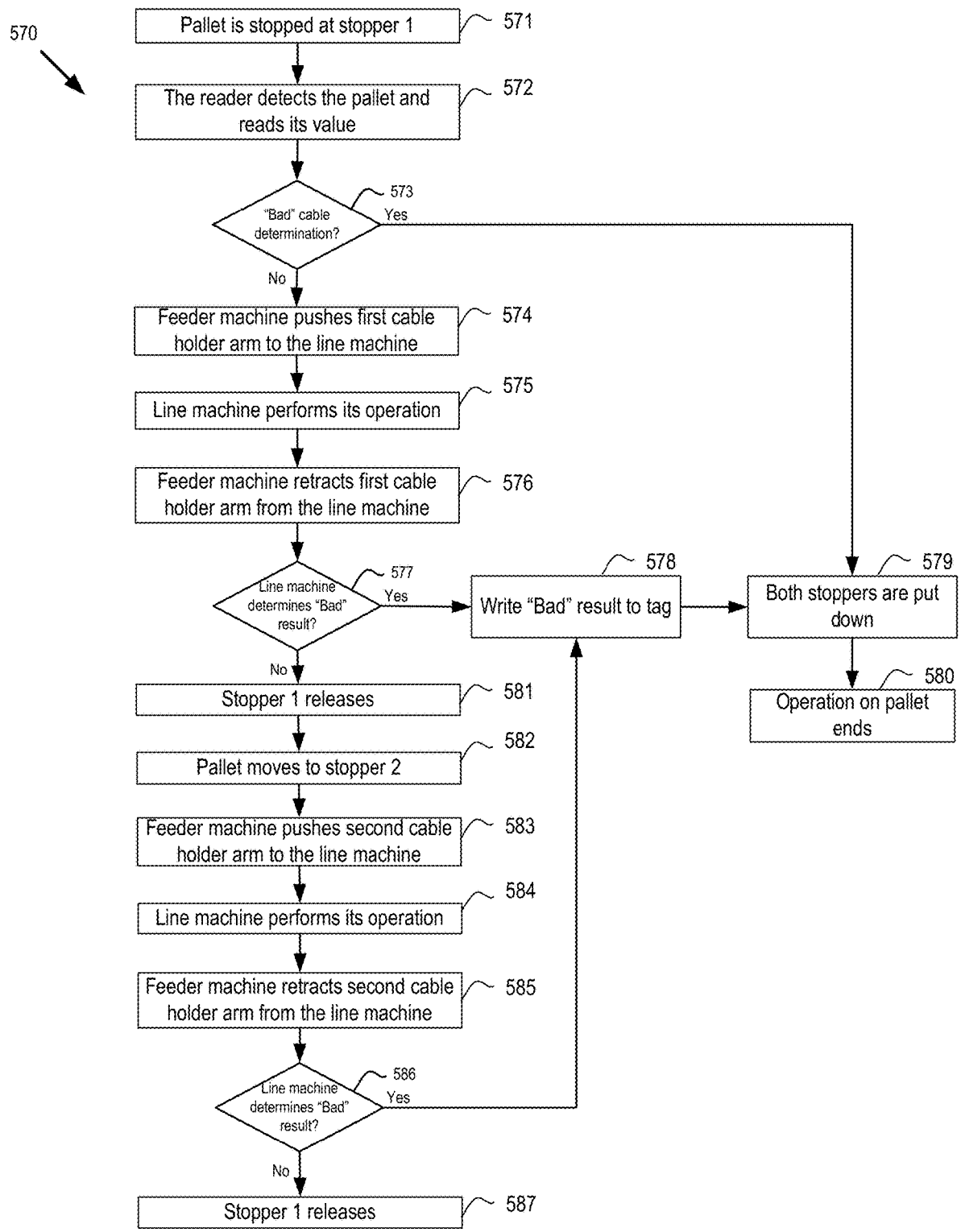
FIG. 5F is a flow chart of the line machine processing a cable and determining whether a cable is designated as faulty.

FIG. 5F is a flow chart 570 of the line machine processing a cable and determining whether a cable is designated as faulty. At 571, the pallet is stopped at stopper 1. At 572, the reader detects the pallet and reads its value (e.g., via a bar code reader an EEPROM reader, or the like). At 573, the line machine determines whether, based on the read value from the pallet, whether the cable is designated as "Bad". If so, processing by the line machine ends and at 579, both stoppers are put down and at 580, the operation on pallet by the line machine ends (and the pallet is moved to the next line machine down the assembly line).

If not, at 574, the feeder machine performs an action, such as pushing first cable holder arm to the line machine, in order to begin processing on one side of the cable held in the pallet. At 575, the line machine performs its operation. At 576, the feeder machine performs another action, such as retracting first cable holder arm from the line machine. At

577, the line machine then determines whether there was a "Bad" result from the operation that the line machine performed at 575. If so, at 578, the line machine writes a "Bad" result to tag the cable in the pallet as defective, and proceeds to 579. Thus, a line machine may cause a value on a tag associated with the pallet to change (e.g., with the tag being a read/write ID) indicating that the cable on the pallet is bad; the other line machines down the line may read the ID of the pallet and determine whether the pallet is bad or not. At the end of the line, the ID is read and its information is stored in the central server. Alternatively, the line machine that identified the error in the cable may send a communication to the central server. In still an alternate embodiment, responsive to a specific line machine determining an error in the cable, the specific line machine may send a communication to the central server, with the communication indicating that a certain ID, which is associated with the pallet, is bad. Thereafter, the other line machines down the line may send the ID of the pallet to the central server. Responsive to the inquiry, the central server may send a response as to whether the pallet is bad or not.

If not, at 581, the Stopper 1 releases (in order to advance the pallet), with the pallet moving to stopper 2 (at 582). At 583, the feeder machine performs another action, such as pushing the second cable holder arm to the line machine. At 584, the line machine performs its operation on the other end of the cable held by the second cable holder arm. At 585, the feeder machine retracts the second cable holder arm from the line machine. Similar to 577, at 586, the line machine then determines whether there was a "Bad" result from the operation that the line machine performed at 584. If so, at 578, the line machine writes a "Bad" result to tag the cable in the pallet as defective, and proceeds to 579. If not, at 587, the stopper 1 releases (in order to send the pallet to the next line machine down the line for further processing).

In one or some embodiments, each pallet contains at least two tags (for redundancy). The tags may act like an electronic bar code (e.g., RFID, NFC, etc.). Separate from (or in addition to) writing whether the cable is "Bad", statistics or other types of data may be written to the tag. Alternatively, or in addition, the tag may include the plan. The line machine may read the tag and perform the appropriate operation accordingly. Thus, instead of the line machine receiving the process from the line control machine, the line machine may receive the process directly from the pallet (e.g., via the tag).

Figure 6A:
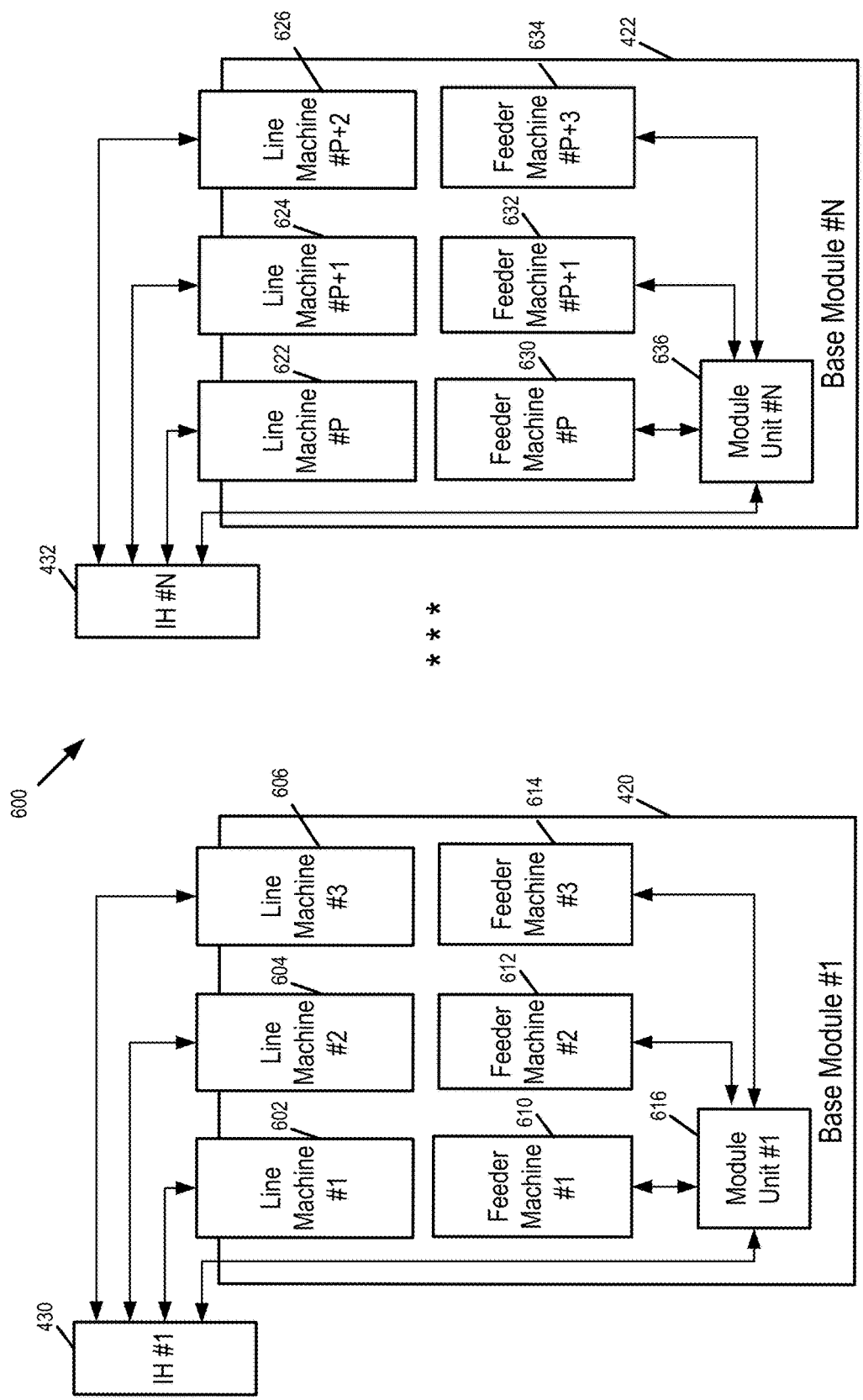
FIG. 6A is a block diagram of multiple base modules.

FIG. 6A is a block diagram 600 of multiple base modules. Specifically, FIG. 6A illustrates base module #1 (420) and base module #N (422), with base module #1 (420) including line machine #1 (602), line machine #2 (604), and line machine #3 (606), and feeder machine #1 (610), feeder machine #2 (612), and feeder machine #3 (614) and with base module #N (422) including line machine #P (622), line machine #P+1 (624), and line machine #P+2 (626), and feeder machine #P (630), feeder machine #P+1 (632), and feeder machine #P+2 (634). Instead of routing commands to the respective feeder machine via the respective line machine, the commands may be routed via a module unit, such as module unit #1 (616) and module unit #N (636). In this way, the feeder machine control may be more flexible.

Figure 6B:
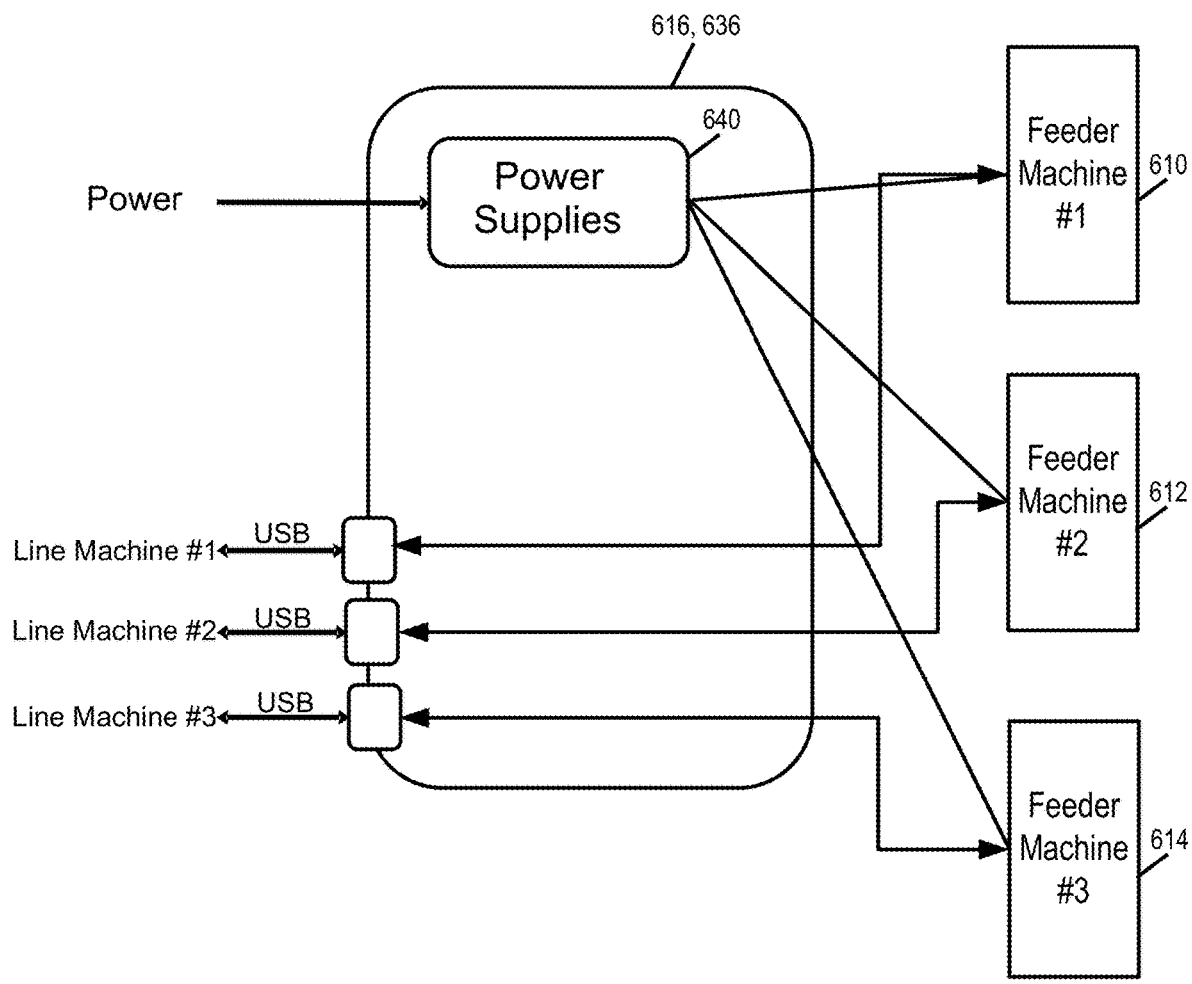
FIG. 6B is a block diagram of a first configuration for supplying power and communication to a plurality of feeder machines.

FIG. 6B is a block diagram of a first configuration for supplying power (via the respective module unit) and communication to a plurality of feeder machines. As shown in FIG. 6B, the module unit distributes power to the feeder machines through power supplies 640. Further, as illustrated, the respective line machine may be routed to the respective feeder machine via separate USB ports. In this regard, the line machines are connected directly to the feeder machines (with the respective feeder machine including local intelligence via a local controller with firmware). Alternatively, the feeder machines may not include a controller, with power, such as DC power, being supplied via the USB port. Thus, the line machine may include a USB port, with a USB cable routed between the USB port and the module unit.

In one or some embodiments, the controller may be included in the respective base module. Further the controller in the respective base module may perform one or more functions, such as any one, any combination, or all of: activating outputs (e.g., LEDs); controlling the emergency operations on the respective base module; monitoring production line status.

Figure 6C:
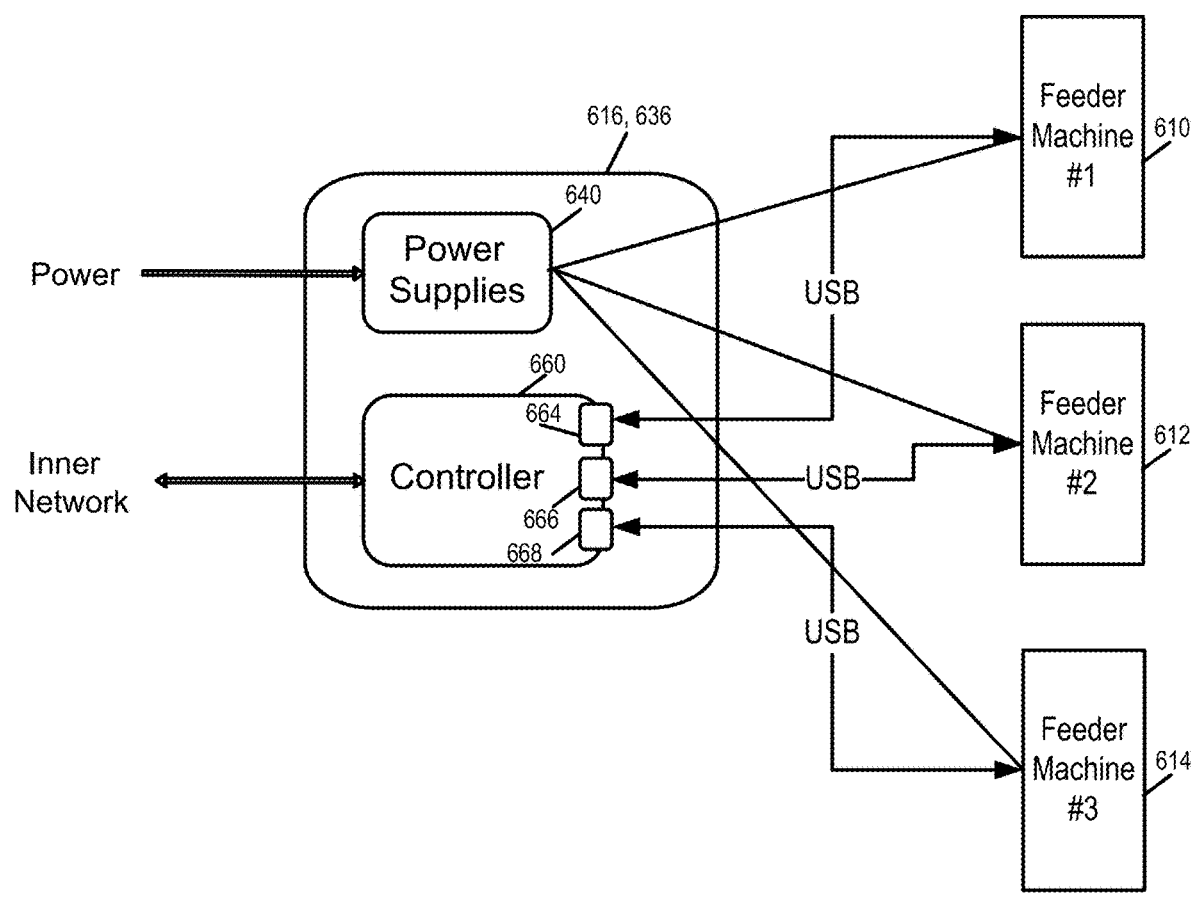
FIG. 6C is a block diagram of a second configuration for supplying power and communication to a plurality of feeder machines.

FIG. 6C is a block diagram of a second configuration for supplying power and communication to a plurality of feeder machines. As shown, the controller 660 on the respective module unit is configured to distribute communications (such as USB connections 664, 666, 648) via an inner network to the respective feeder. Unlike the configuration in FIG. 6B, the controller 660 routes the communications to multiple feeders.

Figure 7A:
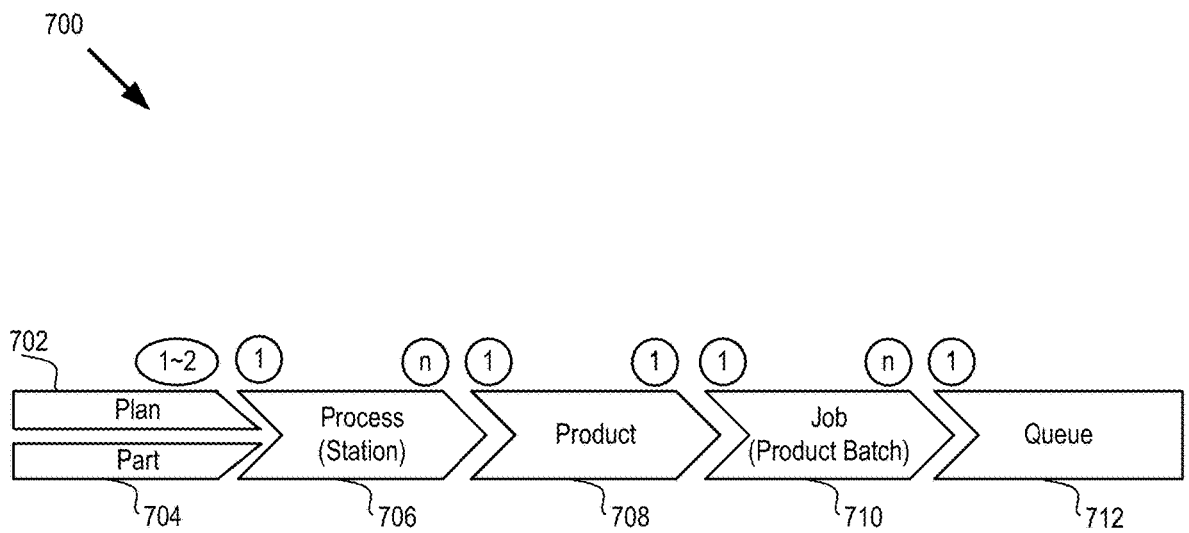
FIG. 7A is a flow diagram illustrating the steps in which a production engineer may generate multiple jobs, which form a queue.

FIG. 7A is a flow diagram 700 illustrating the steps in which a production engineer may generate multiple jobs, which form a queue 712. The production engineer may receive the requirements document (e.g., a drawing that details the requirements for the cable). In response, the production engineer may design a process that generated the assemble cable to meet the requirements. Plan 702 comprises the process performed on the cable (e.g., cut 1 inch from end of cable; receive a pin layout and connect certain color wires to certain locations. In this regard, the plan may be associated with the part 704. The part is the physical structure for the cable (e.g., the cable is of X length, connector Y is to be used, etc.)

The station is based on the part 704 and the plan 702. Specifically, the plan 702 dictates the operations that the station performs and the part for processing. In this regard, for each station, a program (e.g., the plan) and the part are used (e.g., one or more parts may be used, such as soldering wire on the cable to a connector). Further, there may be "n" plans on the same cable on the same station (e.g., cutting through multiple layers until the wire is reached, with the cut through each layer being a plan). In this regard, multiple tasks (e.g., more than 1 plan) may be performed at a station. So that, each station is a combination of plan(s)/part(s). With multiple stations, there may be a sequence, with the process (station) 706 comprising the combination of the stations resulting in a product 708.

A job (product batch) 710 comprises taking the product and putting operational information (e.g., priority information, number of cables to produce; etc.). Finally, the queue 712 is a list of jobs, with the queue arranging the jobs relative to one another. Typically, with similar products, those jobs are scheduled close to each other in the queue in order to keep the same setup (e.g., the same modules are used). Further, priority of the job may dictate the queue.

Figure 7B:
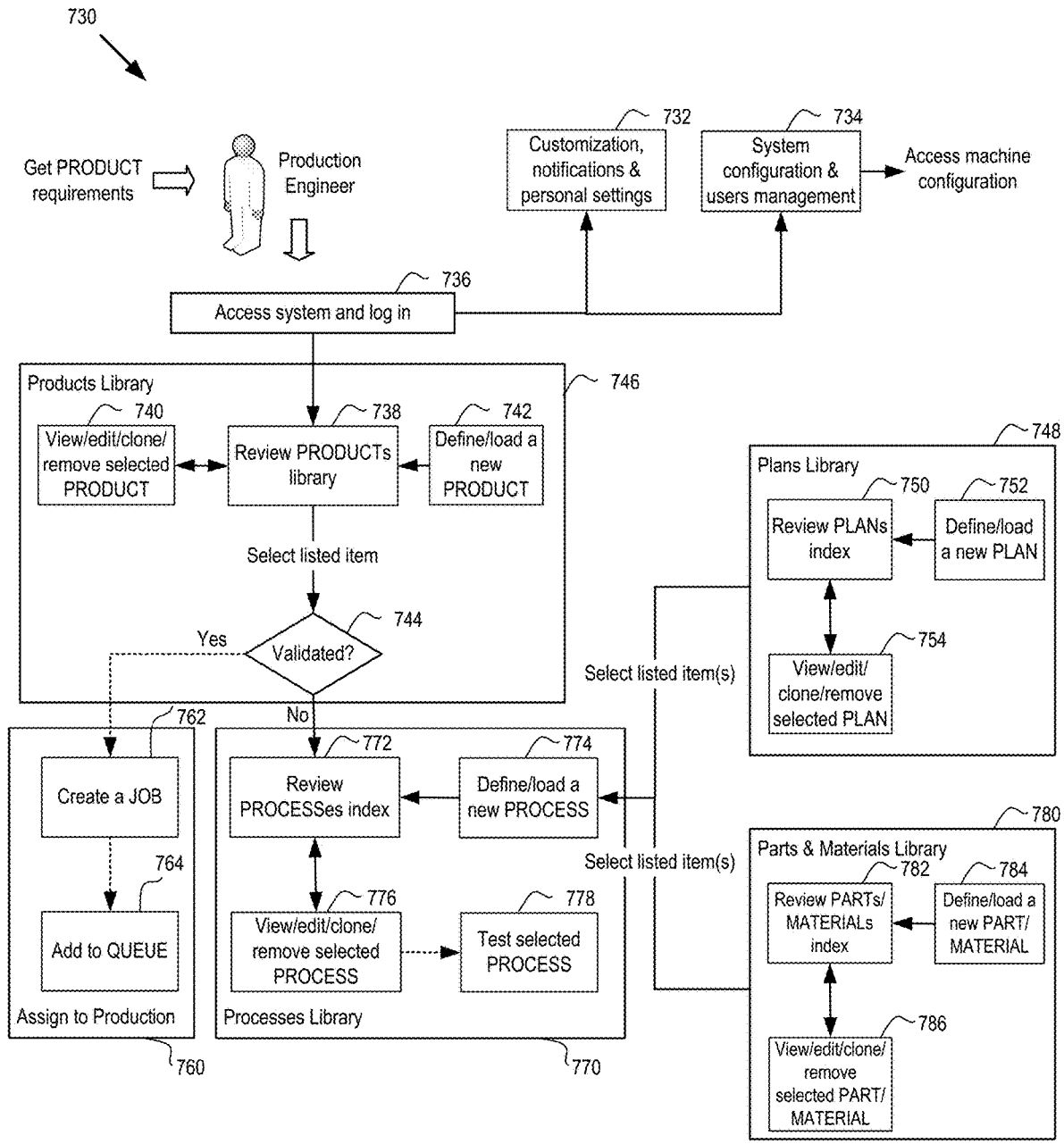
FIG. 7B is an expanded flow diagram of FIG. 7A illustrating the steps in which the production engineer, using product requirements, may generate multiple jobs, which form a queue.

FIG. 7B is an expanded flow diagram 730 of FIG. 7A illustrating the steps in which the production engineer, using product requirements (e.g., a drawing illustrating the requirements of the cable, such as length of the cable; the pin-out (which wire goes where), and some dimensions (where to cut, to strip, etc.), and the process (soldering/crimping, etc.)), may generate multiple jobs, which form a queue. At 736, the production engineer accesses the system and logs in. Further, the production engineer may, at 732, identify customization, notification and personal settings, and at 734, system configuration and users management.

Further, at 746, a products library sequence occurs where at 738 the products library is reviewed, such as based on input at 742 to define/load a new product (if the product produced is not within the products library, or at 740, to view/edit/clone/remove selected product is the product (or a similar product) is resident in the products library. At 744, it is determined whether the selected listed item is validated. If it is validated, at 762, a job is created, and at 764, added to the queue in order to assign to production at 760. If it is not validated, a validation process may be performed with processes library 770. Specifically, at 774, a new process is defined/loaded. This may be performed by selecting listed item(s) from the plans library 748 (in which at 752, a new plan is defined/loaded, at 750, the plans index is reviewed, and at 754, the selected plan is viewed/edited/cloned/removed) or from the parts & materials library 790 (in which at 772, at 784, a new part/material (from parts & materials library 780) is defined/loaded, at 782, the part(s)/material(s) index is reviewed, and at 786, the selected part/material is viewed/edited/cloned/removed). At 772, the process index is reviewed based on the new process (from 774), at 776, the selected process is viewed/edited/cloned/removed and at 778, the selected process is tested. For example, testing may comprise analyzing the process according to pre-defined rules in order to determine whether the processes/parts are correct.

In effect, the production engineer identifies from the product requirements the processes necessary in order to fulfill the requirements. The production engineer may access an entry in a library if a protocol is already defined to fulfill the requirements. Alternatively, the production engineer may define/load a new product (e.g., a set of new processes in order to generate the new product). The production engineer may thus design the stations in a sequence according to the warranted procedure for manufacturing. Also, the production engineer may design for each station in the sequence, the plan(s) and part(s). After the production engineer completes the definition, a validation process may be performed to validate the plan(s), part(s) and sequence (and optionally for saving to the library for later use).

Thus, in one or more embodiments, the technician may be presented with a user interface (UI) or a sequence of UIs. In a specific implementation, one UI may be for a specific machine on the line. For example, a cut-and-strip machine needs input parameters to operate, such as a definition of length (e.g., how many inches to make a cut), type of cutting (e.g., what knives to use/what pressure to apply). The cut-and-strip UI may assist the technician to input the data to the specific machine on the line. In this regard, the various machines on the line may input certain parameters to operate, with the UI(s) tailored to the various machines assisting the technician in inputting those certain parameters. In one implementation, a single UI is used in order to program the entire line. Alternatively, a specific UI may be generated for each machine on the line.

Using the methodology illustrated in FIG. 7B, a smart queue may be generated that optimizes the production time by reducing the setup times (e.g., queueing jobs efficiently so as not to check in/check out machines unnecessarily in order to perform a variety of jobs). Further, the design process (e.g., assembly process) may be tested (such as simulated) by the system in order to determine whether the sequence of the design process is logical. Further, using the one or more UIs, the technician may communicate with the different systems on the line from one display. In this way, the system may centralize the control of the line from one access point, with bi-directional communication (e.g., commands to the stations and feedback from the stations). In this way, control is both centralized and more efficient. As one example, one station may comprise a printer to print indicia on the wires. The printer may receive commands from the central control and may send back to the central control the amount of ink in the printer (in order to determine whether there is sufficient ink in the printer).

Figure 8A:
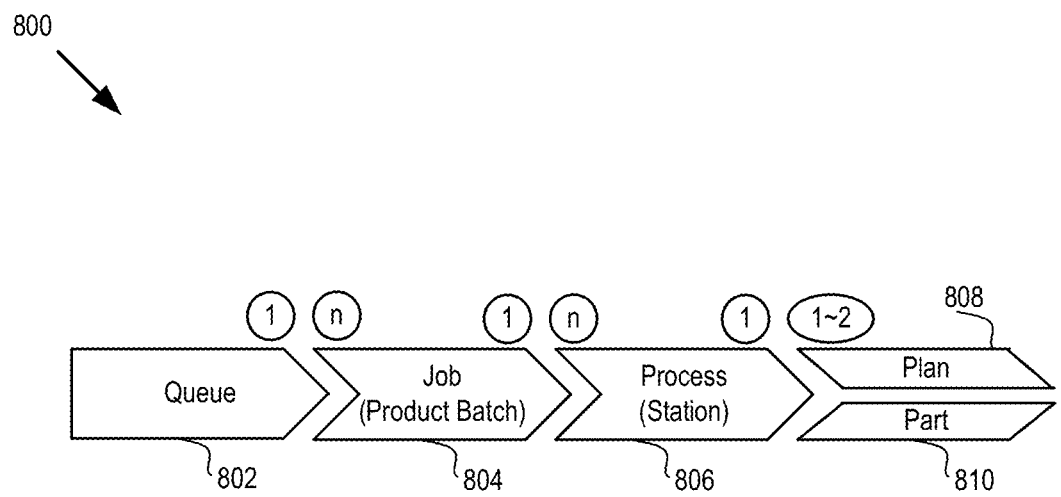
FIG. 8A is a flow diagram illustrating the steps in which a production operator may manage multiple jobs in a queue.

FIG. 8A is a flow diagram 800 illustrating the steps in which a production operator may manage multiple jobs in a queue 802, which may result in a job (product batch) 804, in turn process(s) (station(s) 806, and ultimately plan(s) 808 and part(s) 810.

Figure 8B:
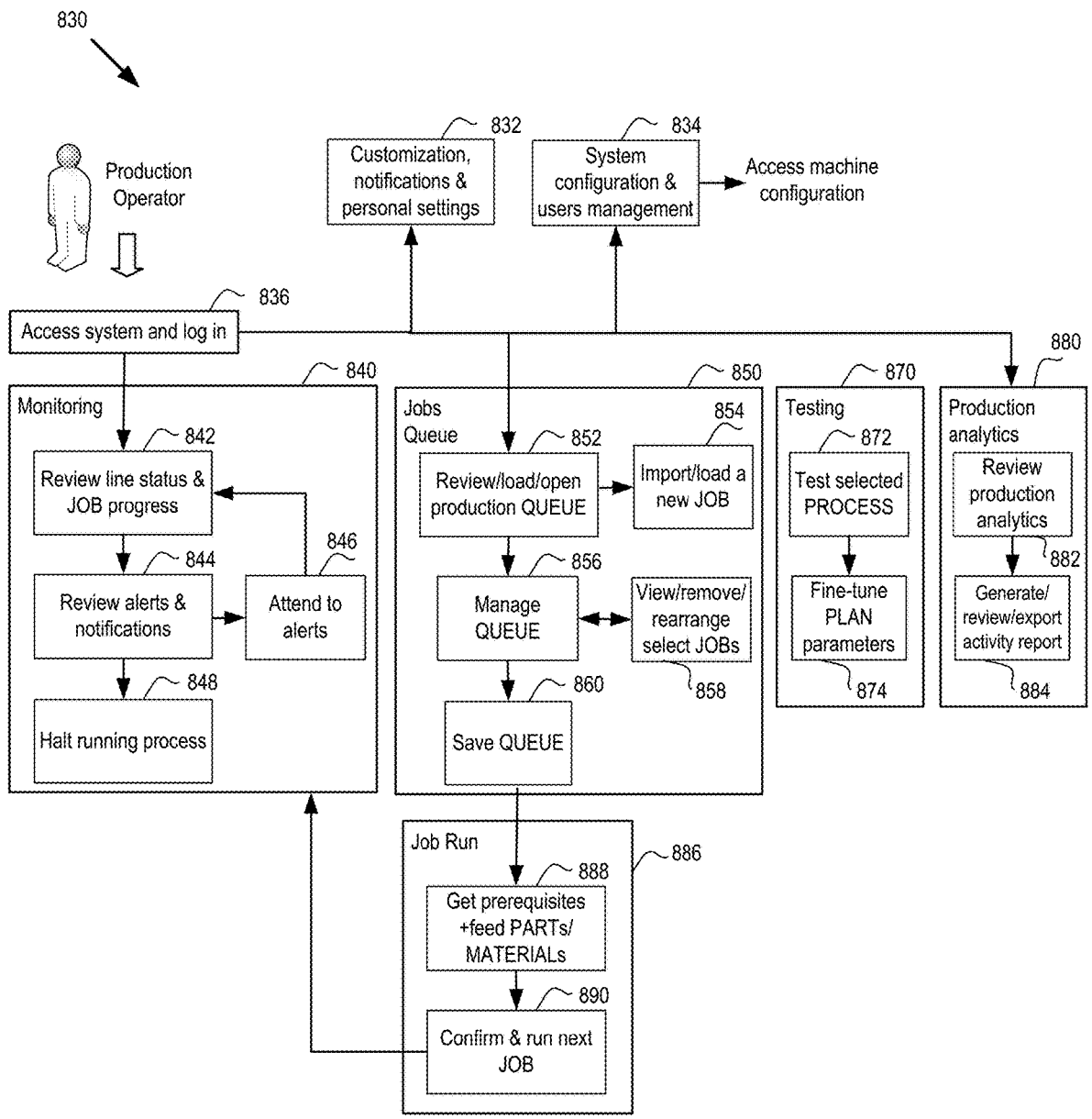
FIG. 8B is an expanded flow diagram of FIG. 8A illustrating the steps in which the production operator manages the line in order to perform the multiple jobs in the queue.

FIG. 8B is an expanded flow diagram 830 of FIG. 8A illustrating the steps in which the production operator manages the line in order to perform the multiple jobs in the queue. At 836, the production operator may access the system and log in. The production operator may use the customization, notification, and personal settings (832) and the system configuration and users management (834) in configuring the system.

The products library at 840 includes reviewing the line status and job progress at 842, reviewing alerts and notifications at 844, if alerts are present, attending to them at 846 (such as to command to enter safe mode, discussed above), and halt running the process at 848.

The jobs queue at 850 includes reviewing/loading/opening the production queue at 852, (such as by importing/loading a new job at 854), managing the queue at 856 (such as by view/removing/rearranging select jobs at 858, and saving the queue at 860. The testing at 870 includes testing the selected process at 872, and fine-tuning the plan parameters at 874. Production analytics at 880 includes reviewing production analytics at 882 and generating/reviewing/exporting an activity report at 884. Finally, the job run at 886 includes getting prerequisites+feed parts/materials for the various line machines to construct the cable at 888 and confirming & running the next job at 890, which loops back to It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A cable processing system comprising:
   a cartridge configured to hold a cable and to interface with a machine at a station in order to process the cable, the cartridge comprising:
   a base structure comprising a connector configured to connect to a conveyor in order to move the cartridge to the station;
   first pincers configured to hold a first part of the cable; and
   second pincers configured to hold to a second part of the cable;
   at least one actuator device external to the cartridge and comprising at least two rollers, wherein at least one of the at least two rollers comprises a driven roller to impart a motive force directly onto at least a part of the cable; and
   wherein the at least one actuator device is configured to:

move at least one of the at least two rollers toward the cartridge into physical contact with the cable on the cartridge; and generate the motive force while both of the at least two rollers are in physical contact with opposite sides of the cable in order to impart the motive force directly onto the at least a part of cable thereby spooling at least one end of the cable toward or away from the machine.

2. The cable processing system of claim 1, further comprising at least one motor configured to drive the driven roller; and wherein, after the driven roller is in physical contact with the cable, the at least one actuator device is configured to control the at least one motor to impart a rotating force via the driven roller in order to spool at least one of a first end or a second end of the cable toward or away from the machine.

3. The cable processing system of claim 2, wherein the at least two rollers comprises at least one non-driven roller; and wherein the at least one non-driven roller is in physical contact with the cable on an opposite side of the cable from the physical contact of the driven roller driven by the at least one motor.

4. The cable processing system of claim 3, wherein the at least one actuator device is configured to move the driven roller and the at least one non-driven roller to contact the cable; and wherein the cartridge includes a window through which one of the driven roller or the at least one non-driven roller is moved through to physically contact the cable.

5. The cable processing system of claim 4, wherein the driven roller comprises a friction roller configured to impart the motive force onto the cable upon contact; and wherein the at least one non-driven roller includes a groove to mate with the cable.

6. The cable processing system of claim 4, wherein, responsive to an indication that the cartridge is at the station, the at least one actuator device is configured to receive one or more first communications indicative of moving the driven roller and the at least one non-driven roller into contact with the cable and of driving the driven roller to spool the at least one of the first end or the second end of the cable toward the machine; and wherein, responsive to an indication that the machine has completed at least a part of its processing on the cable, the at least one actuator device is configured to receive one or more second communications indicative of driving the driven roller to spool the at least one of the first end or the second end of the cable away from the machine and moving the driven roller and the at least one non-driven roller away from the cable to remove contact with the cable.

7. The cable processing system of claim 4, wherein the first pincers are positioned on a first portion of the cartridge wherein the at least one actuator device is configured to move a first rigid structure into contact with a first part of the first portion and apply force to the first part of the first portion in order to release the first pincers; and wherein, responsive to the at least one actuator device moving the first rigid structure into contact with the first part of the first portion and applying the force to the first part in order to release the first pincers, the at least one actuator device is configured to drive the driven roller in order to spool the first end of the cable toward or away from the machine.

8. The cable processing system of claim 7, wherein the at least one actuator device is further to move a second rigid structure into contact with a second part of the first portion, the second part of the first portion on an opposite side of the first portion such that the second rigid structure reduces a bending force on the first portion caused by applying the first rigid structure applying the force to the first part of the first portion.

9. The cable processing system of claim 4, wherein the at least one actuator device is further configured to rotate the driven roller such that when the driven roller is in contact with the cable and is driven, the driven roller imparts a rotational force on the at least one of the first end or the second end of the cable.

10. The cable processing system of claim 4, further comprising a sensor configured to send a location of the first end of the cable; and wherein the at least one actuator device is configured to control an amount of rotation of the driven roller, in spooling the first end of the cable toward the machine, based on the location of the first end of the cable.

11. The cable processing system of claim 1, wherein the first pincers comprises a first set of pincers;

wherein the second pincers comprises a second set of pincers; wherein the cartridge includes a flat portion to support the cable; and further comprising a loading actuator configured to:

grip multiple portions of the cable;

cause release of the first set of pincers and the second set of pincers; move the cable such that the cable contacts the flat portion; and cause reengagement of the first set of pincers and the second set of pincers such that the first set of pincers and the second set of pincers hold a first end of the cable and a second end of the cable, respectively.

12. The cable processing system of claim 11, wherein the loading actuator comprises a cartridge-loading machine, the cartridge-loading machine configured to:

apply force to the first set of pincers and the second set of pincers so that the first set of pincers and the second set of pincers open;

place a bound coiled unprocessed cable onto the cartridge using a plurality of grippers;

after placing the bound coiled unprocessed cable onto the cartridge, remove the force applied to the first set of pincers and the second set of pincers such that the first set of pincers and the second set of pincers close onto respective loose ends of the bound coiled unprocessed cable; and after removing the force applied to the first set of pincers and the second set of pincers, release the plurality of grippers that were holding the bound coiled unprocessed cable in transit to the cartridge.

13. The cable processing system of claim 1, wherein the at least one actuator device is further configured to control the at least two rollers to physically contact the opposite sides of the cable.

14. The cable processing system of claim 13, wherein, after the at least two rollers are in physical contact with the opposite sides of the cable, the at least one actuator device is configured to control the driven roller to impart the motive force in order to spool at least one of a first end or a second end of the cable toward or away from the machine.

15. The cable processing system of claim 14, wherein, responsive to an indication that the cartridge is at the station, the at least one actuator device is configured to receive one or more first communications indicative of moving the at least one of the at least two rollers into contact with the cable and of generating the motive force to spool the at least one of the first end or the second end of the cable toward the machine; and wherein, responsive to an indication that the machine has completed at least a part of its processing on the cable, the at least one actuator device is configured to receive one or more second communications indicative of moving the at least one of the at least two rollers into contact with the cable and of generating the motive force to spool the at least one of the first end or the second end of the cable away from the machine and moving the at least one of the at least two rollers away from the cable to remove contact with the cable.

16. The cable processing system of claim 15, wherein the first pincers are positioned on a first portion of the cartridge and comprises pincers;

wherein the at least one actuator device is configured to move a first rigid structure into contact with a first part of the first portion and apply force to the first part of the first portion in order to release the first pincers; and wherein, responsive to the at least one actuator device moving the first rigid structure into contact with the first part of the first portion and applying the force to the first part in order to release the first pincers, the at least one actuator device is configured to control the driven roller in order to spool the first end of the cable toward or away from the machine.

17. The cable processing system of claim 16, wherein the at least one actuator device is further to move a second rigid structure into contact with a second part of the first portion, the second part of the first portion on an opposite side of the first portion such that the second rigid structure reduces a bending force on the first portion caused by applying the first rigid structure applying the force to the first part of the first portion.

18. The cable processing system of claim 15, further comprising a sensor configured to send a location of the first end of the cable; and wherein the at least one actuator device is configured to control, based on the location of the first end of the cable, an amount of the motive force imparted by the driven roller in spooling the first end of the cable toward the machine.

19. The cable processing system of claim 15, wherein the driven roller includes a first gripping surface to impart the motive force upon the cable.

20. The cable processing system of claim 19, wherein at least one of the two rollers comprises a non-driven roller that includes a second gripping surface that is shaped as a groove to mate with the cable.

* * * * *

UNITED STATES PATENT AND TRADEMARK OFFICE
CERTIFICATE OF CORRECTION

PATENT NO. : 11,476,628 B2
APPLICATION NO. : 17/075160
DATED : October 18, 2022
INVENTOR(S) : Tal Pechter and Hanan Ben-Ron Page 1 of 1

It is certified that error appears in the above-identified patent and that said Letters Patent is hereby corrected as shown below:

In the Claims

Claim 16, Column 27, Line 18:
Delete the phrase "and comprises pincers"

Signed and Sealed this
Second Day of January, 2024

Katherine Kelly Vidal
*Director of the United States Patent and Trademark Office*